(12) United States Patent
VanRemortel et al.

(10) Patent No.: US 9,034,096 B2
(45) Date of Patent: *May 19, 2015

(54) NEPHELINE SYENITE POWDER WITH CONTROLLED PARTICLE SIZE AND NOVEL METHOD OF MAKING SAME

(75) Inventors: Scott VanRemortel, Bakersville, NC (US); Robert Ratcliff, Bakersville, NC (US); Ibezim Anazia, Burnsville, NC (US); Louis M. Schlesinger, Spruce Pine, NC (US)

(73) Assignee: Unimin Corporation, New Canaan, CT (US)

( * ) Notice: Subject to any disclaimer, the term of this patent is extended or adjusted under 35 U.S.C. 154(b) by 1793 days.

This patent is subject to a terminal disclaimer.

(21) Appl. No.: 12/215,643

(22) Filed: Jun. 27, 2008

(65) Prior Publication Data

US 2009/0013905 A1  Jan. 15, 2009

Related U.S. Application Data

(60) Provisional application No. 60/958,757, filed on Jul. 9, 2007.

(51) Int. Cl.
*B02C 19/06* (2006.01)
*C04B 33/02* (2006.01)
(Continued)

(52) U.S. Cl.
CPC ............. *B02C 19/065* (2013.01); *C04B 33/02* (2013.01); *C04B 33/025* (2013.01); *C04B 33/1305* (2013.01); *C04B 35/6261* (2013.01); C04B 2235/3472 (2013.01); C04B 2235/5436 (2013.01); C04B 2235/5481 (2013.01); *C08K 3/34* (2013.01); *C09C 1/402* (2013.01);
(Continued)

(58) Field of Classification Search
CPC ............. B02C 19/065; C01P 2004/51; C01P 2004/53; C01P 2004/61; C01P 2006/12; C01P 2006/60; C01P 2006/62; C01P 2006/63; C01P 2006/64; C04B 2235/3472; C04B 2235/5436; C04B 2235/5481; C04B 33/02
USPC ........................ 106/400; 428/402; 241/24.11
See application file for complete search history.

(56) References Cited

U.S. PATENT DOCUMENTS

| 2,261,884 A | 11/1941 | Koenig |
| 2,262,951 A | 11/1941 | Lyle |

(Continued)

FOREIGN PATENT DOCUMENTS

| GB | 1297622 | 11/1972 |
| JP | 63 158246 | 7/1988 |

(Continued)

OTHER PUBLICATIONS

International Search Report dated Sep. 29, 2008 (Application No. PCT/US2008/008005; filed Jun. 27, 2008).

(Continued)

*Primary Examiner* — Shuangyi Abu Ali
(74) *Attorney, Agent, or Firm* — Rankin, Hill & Clark LLP

(57) ABSTRACT

An ultra-fine nepheline syenite powder produced from a pre-processed nepheline syenite powder feedstock. The powder having a "controlled" maximum grain size D95 or D99 of less than about 20 microns and a "controlled" minimum grain size D5 in the range of 2-8 microns with a particle size spread D5-D95 of less than about 12 microns.

3 Claims, 23 Drawing Sheets

(51) Int. Cl.

| | |
|---|---|
| *C04B 33/13* | (2006.01) |
| *C04B 35/626* | (2006.01) |
| *C09C 1/40* | (2006.01) |
| *C09D 7/12* | (2006.01) |
| *C09K 3/14* | (2006.01) |
| *C08K 3/34* | (2006.01) |
| *C09C 3/04* | (2006.01) |

(52) U.S. Cl.
CPC ............ *C09D 7/1216* (2013.01); *C09D 7/1283* (2013.01); *C09K 3/1409* (2013.01); *C09C 1/405* (2013.01); C09C 3/041 (2013.01); C01P 2004/51 (2013.01); C01P 2004/53 (2013.01); C01P 2004/61 (2013.01); C01P 2006/12 (2013.01); C01P 2006/62 (2013.01); C01P 2006/63 (2013.01); C01P 2006/64 (2013.01); C01P 2006/60 (2013.01)

(56) References Cited

U.S. PATENT DOCUMENTS

| | | | |
|---|---|---|---|
| 2,269,912 A | 1/1942 | Ladoo et al. | |
| 2,478,645 A | 8/1949 | Thiess | |
| 2,765,074 A | 10/1956 | Diamond | |
| 2,871,132 A | 1/1959 | Hummel | |
| 3,044,619 A | 7/1962 | Knolle | |
| 3,079,309 A | 2/1963 | Wainer | |
| 3,326,701 A | 6/1967 | Von Freyhold | |
| 3,389,002 A | 6/1968 | Huffcut | |
| 3,486,706 A | 12/1969 | Weyand | |
| 3,721,066 A | 3/1973 | Teller | |
| 3,917,489 A | 11/1975 | Waters, Jr. | |
| 3,998,624 A | 12/1976 | Harris et al. | |
| 4,028,289 A | 6/1977 | Brown | |
| 4,036,505 A | 7/1977 | Floyd et al. | |
| 4,130,423 A | 12/1978 | Chastant et al. | |
| 4,183,760 A | 1/1980 | Funk et al. | |
| 4,242,251 A | 12/1980 | Aishima et al. | |
| 4,396,431 A | 8/1983 | Seeney et al. | |
| 4,468,473 A | 8/1984 | Drolet et al. | |
| 4,551,241 A | 11/1985 | Saverse et al. | |
| 4,639,576 A | 1/1987 | Shoemaker et al. | |
| 4,640,797 A | 2/1987 | Goguen | |
| 4,663,226 A | 5/1987 | Vajs et al. | |
| 4,743,625 A | 5/1988 | Vajs et al. | |
| 4,781,671 A | 11/1988 | Pober et al. | |
| 4,850,541 A | 7/1989 | Hagy | |
| 4,869,786 A | 9/1989 | Hanke | |
| 4,883,714 A | 11/1989 | Stockl et al. | |
| 4,885,832 A | 12/1989 | English | |
| 4,979,686 A | 12/1990 | Szegvari et al. | |
| 5,066,330 A | 11/1991 | Holcombe, Jr. et al. | |
| 5,080,293 A | 1/1992 | Szegvari et al. | |
| 5,153,155 A | 10/1992 | Kohut | |
| 5,199,656 A | 4/1993 | Szegvari et al. | |
| 5,236,499 A | 8/1993 | Chervenak et al. | |
| 5,380,356 A | 1/1995 | Gundlach et al. | |
| 5,423,490 A | 6/1995 | Zampini | |
| 5,530,057 A | 6/1996 | Humphrey et al. | |
| 5,686,507 A * | 11/1997 | Hermele et al. ............... 523/153 | |
| 5,709,909 A | 1/1998 | Leibfarth et al. | |
| 5,866,646 A | 2/1999 | Radosta | |
| 5,883,029 A | 3/1999 | Castle | |
| 5,961,943 A | 10/1999 | Komatsu et al. | |
| 6,074,474 A * | 6/2000 | Broome et al. ............... 106/486 | |
| 6,310,129 B1 | 10/2001 | Lilly et al. | |
| 6,543,710 B2 | 4/2003 | Konetzka et al. | |
| 6,569,923 B1 | 5/2003 | Slagter | |
| 6,596,837 B2 | 7/2003 | Hogge et al. | |
| 6,739,456 B2 | 5/2004 | Svoronos et al. | |
| 6,790,904 B2 | 9/2004 | White et al. | |
| 6,793,875 B1 | 9/2004 | Shaw et al. | |
| 6,905,634 B2 | 6/2005 | Burnell-Jones | |
| 7,008,513 B2 | 3/2006 | Davenport et al. | |
| 7,751,150 B2 * | 7/2010 | Horio .......................... 360/254.7 | |
| 7,757,976 B2 | 7/2010 | Schlesinger et al. | |
| 2002/0013401 A1 | 1/2002 | Friel et al. | |
| 2002/0137872 A1 | 9/2002 | Schneider et al. | |
| 2002/0173597 A1 | 11/2002 | Zarnoch et al. | |
| 2003/0056696 A1 | 3/2003 | Fenske et al. | |
| 2003/0085383 A1 | 5/2003 | Burnell-Jones | |
| 2003/0085384 A1 | 5/2003 | Burnell-Jones | |
| 2003/0215770 A1 | 11/2003 | Sekino et al. | |
| 2003/0224174 A1 | 12/2003 | White et al. | |
| 2003/0229157 A1 | 12/2003 | Schneider et al. | |
| 2004/0068048 A1 | 4/2004 | Giles et al. | |
| 2004/0087433 A1 | 5/2004 | Herold | |
| 2004/0175407 A1 | 9/2004 | McDaniel | |
| 2005/0019574 A1 | 1/2005 | McCrary | |
| 2005/0059765 A1 | 3/2005 | Finch et al. | |
| 2005/0167534 A1 | 8/2005 | Tomikawa et al. | |
| 2005/0214534 A1 | 9/2005 | Adamo et al. | |
| 2006/0068314 A1 | 3/2006 | Kawata | |
| 2006/0075930 A1 | 4/2006 | Wang et al. | |
| 2006/0078748 A1 | 4/2006 | Ambrose et al. | |
| 2006/0081371 A1 | 4/2006 | Duenckel et al. | |
| 2006/0118664 A1 | 6/2006 | Sare et al. | |
| 2006/0140878 A1 | 6/2006 | Cornelius et al. | |
| 2006/0160930 A1 | 7/2006 | Schneider | |
| 2006/0234026 A1 | 10/2006 | Huusken | |
| 2006/0235113 A1 | 10/2006 | Dorgan et al. | |
| 2008/0015104 A1 * | 1/2008 | Janik et al. ..................... 501/128 | |

FOREIGN PATENT DOCUMENTS

| | | | | |
|---|---|---|---|---|
| WO | WO2005116137 | * | 12/2005 | ............... B29B 7/84 |
| WO | 2007/123674 | | 11/2007 | |
| WO | 2008/008413 | | 1/2008 | |
| WO | 2008008410 A1 | | 1/2008 | |
| WO | 2009128857 A1 | | 10/2009 | |

OTHER PUBLICATIONS

International Preliminary Report on Patentability in related International Application No. PCT/US2008/008005; Mar. 9, 2010.
Office action dated Jan. 19, 2011 in corresponding Chinese Patent Application No. 2008800239354.
MINBLOC, Physical and Chemical Properties Information Brochure, Oct. 2001.
MINBLOC Antiblocking Additives, Information Brochure, Copyright 2001.
MINBLOC Antiblocking Additives, Technical Data, Jun. 1988.
Koenig, C.J.; "Influence of Particle-Size Distribution on the Properties of Nepheline Syenite"; Journal of the American Ceramic Society; Blackwell Publishing; Malden, MA; vol. 38, No. 7; Jul. 1, 1955; pp. 231-240; XP008150089.
Bath, Frank; "Consistent Milling on a Nano Scale," Ceramic Industry, Feb. 2005.
Unimin Corporation, Minex Functional Fillers and Extenders Technical Data, May 2001; pp. 1-2.
Ibrahim et al; "Dry Magnetic Separation of Nepheline Syenite Ores"; Physiochemical Problems of Mineral Processing, 38 (2002); pp. 173-183.
Koenig, C.J.; Some Fundamental Properties of Nepheline Syenite; pp. 35-38, 1938.
"Nepheline Syenite" from Wikipedia, Sep. 2006.

* cited by examiner

| TARGET SIZE | D99.9 | D99 | D95 | D90 | D75 | D50 | D25 | D10 | D5 | D1 |
|---|---|---|---|---|---|---|---|---|---|---|
| 0 X 10 (1) | 10.5 | 8.93 | 7.44 | 6.51 | 4.79 | 3.10 | 1.90 | 0.73 | 0.25 | 0.11 |
| 0 X 6 (2) | 5.83 | 5.40 | 4.86 | 4.48 | 3.50 | 2.15 | 0.64 | 0.39 | 0.33 | 0.26 |
| 0 X 4 (3) | 5.07 | 4.63 | 4.15 | 2.41 | 1.78 | 0.58 | 0.40 | 0.32 | 0.29 | 0.25 |
| 0 X 2 (4) | 2.74 | 2.38 | 1.99 | 1.74 | 1.19 | 0.70 | 0.43 | 0.33 | 0.28 | 0.25 |
| 2 X 15 (5) | 11.7 | 10.6 | 9.37 | 8.54 | 6.86 | 4.67 | 3.10 | 2.41 | 2.16 | 1.87 |
| 2 X 10 (6) | 10.7 | 9.46 | 7.95 | 7.05 | 5.42 | 3.79 | 2.61 | 1.93 | 1.65 | 1.29 |
| 2 X 6 (7) | 6.54 | 5.70 | 4.92 | 4.44 | 3.60 | 2.77 | 2.11 | 1.67 | 1.47 | 1.21 |
| 2 X 4 (8) | 6.25 | 5.50 | 4.63 | 4.13 | 3.24 | 2.36 | 1.65 | 1.11 | 0.31 | 0.11 |
| 4 X 15 (9) | 17.1 | 15.7 | 14.2 | 13.2 | 11.2 | 8.82 | 6.99 | 5.78 | 5.16 | 2.33 |
| 5 X 15 (10) | 17.1 | 16.1 | 14.6 | 13.7 | 11.7 | 9.41 | 7.46 | 6.20 | 5.57 | 4.68 |
| 6 X 15 (11) | 18.6 | 17.9 | 15.1 | 14.8 | 12.4 | 10.1 | 8.02 | 6.46 | 5.72 | 4.47 |

FIG. 6

| | TARGET ↓ | | | | | TARGET ↓ | |
|---|---|---|---|---|---|---|---|
| D99 | D95 | D90 | D75 | D50 | D10 | D5 | D1 |
| 16.1μm | 14.6μm | 13.7μm | 11.7μm | 9.4μm | 6.2μm | 5.6μm | 4.7μm |

MODEL 400 AFG JET MILL RUN

| | | |
|---|---|---|
| MILL TYPE | 400 AFG | 410a (412) |
| CLASSIFIER TYPE | STANDARD STEEL | |
| CLASSIFIER RPM | 4,250 | |
| CLASSIFIER AMPS EMPTY | 4 | |
| CLASSIFIER AMPS FULL | 9-10 | |
| NOZZLE TYPE | LAVALLE | |
| NOZZLE SIZE (mm) | 14 | |
| STEM SIZE (mm) | 14 | |
| GRIND AIR PRESSURE (PSI) | 32 | |
| GRIND AIR FLOW (CFM) | 610 | |
| SYSTEM AIR FLOW (CFM) | 620 | |
| MILL PRESSURE ("WC) | -3 | |
| BED LEVEL (BEFORE/AFTER) | EVEN/EVEN | |
| BED WEIGHT (BEFORE/DURING/AFTER) | 66/60/66 | |
| FEEDER TYPE | K-TRON | |
| FEEDER OUTPUT (%) | 19% | |
| TIME (MIN.) | 49 | |
| PRODUCT (LBS.) | 198 | |
| CAPACITY (LBS./HR.) | 242 | |
| $d4$ ($\mu m$) | 2.24 | |
| $d50$ ($\mu m$) | 5.53 | |
| $d96$ ($\mu m$) | 11.69 | |
| % < 5 $\mu m$ | 42.9% | |
| % < 15 $\mu m$ | 99.8% | |

FIG. 22

MODEL 200 ATP AIR CLASSIFIER (AC) WITH JET MILLED PRODUCT

| | | |
|---|---|---|
| MILL TYPE | 200 ATP | 420a (422) |
| MATERIAL | JM PRODUCT | |
| CLASSIFIER TYPE | STANDARD STEEL | |
| CLASSIFIER RPM | 4,500 | |
| INSERT | YES | |
| CLASSIFIER AMPS (IDLE) | 4 | |
| CLASSIFIER AMPS (LOAD) | 4-5 | |
| GS AIRFLOW (CFM) | 500 | |
| FEED INLET AIRFLOW (CFM) | 200 | |
| TOTAL AIRFLOW (CFM) | 700 | |
| BLOWER AMPS (IDLE/LOAD) | 39/39 | |
| CLASSIFIER ΔP (IN. WG) | 50/50 | |
| FEEDER TYPE | K-TRON | |
| FEEDER SETTING | 320 HIGH | |
| TIME (MIN.) | 39.53 | |
| FEED AMOUNT (LBS.) | 143 | |
| FEED RATE (LB./HR.) | 217 | |
| PRODUCT FINES (LBS.) | 94.0 | |
| PRODUCT COARSE (LBS.) | 42.0 | |
| FINES YIELD (%) | 71% | |
| COARSE YIELD (%) | 29% | |
| SAMPLE | COARSE | |
| d4 (μm) | 5.75 | |
| d50 (μm) | 8.71 | |
| d96 (μm) | 13.37 | |
| % < 5 μm | 0.5% | |
| % < 15 μm | 98.7% | |

FIG. 23

MINEX 5X15 POWDER FLAT SPECIFICATION

| PARAMETER | MIN | MAX |
|---|---|---|
| PARTICLE SIZE ANALYSIS, % > 15 MICRONS (COULTER LS13-320) | – | 4 |
| PARTICLE SIZE ANALYSIS, % > 20 MICRONS (COULTER LS13-320) | – | 0 |
| PARTICLE SIZE ANALYSIS, % < 5 MICRONS (COULTER LS13-320) | – | 4 |
| PARTICLE SIZE ANALYSIS, MEDIAN SIZE, MICRONS (COULTER LS13-320) | 9 | 11 |
| OIL ABSORPTION, % (ASTM D-281) | 25 | 35 |
| DRY BRIGHTNESS, % (TAPPI T552) | 83 | – |
| MOISTURE, % (CLP-19A) | – | 0.30 |
| pH VALUE | 9.0 | 11.0 |

FIG. 24

NEPHELINE SYENITE POWDER WITH CONTROLLED PARTICLE SIZE AND NOVEL METHOD OF MAKING SAME

CROSS REFERENCES TO RELATED APPLICATIONS

This application claims priority upon U.S. provisional application Ser. No. 60/958,757 filed Jul. 9, 2007 (UMEE 2 00090P), herein incorporated by reference.

The present invention relates to the art of fine grain nepheline syenite powder as a category in the nepheline syenite industry and more particularly to a novel "ultra-fine" nepheline syenite powder having controlled particle size and the method of making this novel ultra-fine nepheline syenite powder. Coatings and films using the novel ultra-fine nepheline syenite powder constitute a further aspect of this invention.

Unimin Corporation of New Canaan, Conn. is a leading source of mined raw nepheline syenite, which is a natural occurring rock formed from several minerals and is found in deposits in only limited areas of the world. The nepheline syenite industry has developed technology that is used for grinding and crushing raw nepheline syenite rock and then converting the particulated nepheline syenite into usable fine grain powder. Thus, the field to which the present invention is directed is the industry of nepheline syenite and the technology of converting nepheline syenite as mined into usable form that is a commercial powder. In about 2001, Unimin Corporation, after substantial research and development, invented an ultra-fine nepheline syenite powder, which powder was believed to be the smallest commercially available and economically producible nepheline syenite powder. This was the first ultra-fine nepheline syenite powder and was sold under the trademark Minex 10. This powder had a maximum particle or grain size D99 substantially above 15 microns. However, it was classified as "ultra-fine" nepheline syenite powder because it had a maximum particle size of less than about 20 microns. However, in some instances maximum particle size is referred to as the D95 value. Minex 10 was the smallest nepheline syenite powder available to the market for many years. Such "ultra-fine" nepheline syenite powder had the smallest commercially available grain size. After years of research and development Unimin Corporation, again using its expertise and know-how acquired at extremely high cost over many years of work by its employees invented a novel version of ultra-fine nepheline syenite powder. This new ultra-fine nepheline syenite powder had a maximum grain size D99 of less than 10 microns, which was the size believed at that time to be unobtainable for commercial production. This newly developed ultra-fine nepheline syenite powder actually had a maximum grain size D99 of less than about 6 microns. Such smaller grain size ultra-fine nepheline syenite powder was found to create drastically different physical characteristics and properties in certain commercial products, such as coatings and films. Consequently, the recently invented nepheline syenite powder that imparted improved, albeit different physical characteristics and properties to many end products was believed to be the ultimate in nepheline syenite powder, especially for coatings and films. This powder created a new art for using naturally occurring materials and is the art to which the present invention is directed. The new nepheline syenite powder was "ultra-fine" and had a maximum particle or grain size that was less than 10 microns. Indeed, the target particle size D99 was about 6 microns. This newly developed ultra-fine nepheline syenite powder has now been introduced into the market under the trademark Minex 12. Prior to Minex 12 the only other commercially available ultra-fine nepheline syenite powder was sold as Minex 7 or Minex 10. Minex 7 having a maximum grain size D99 of about 20 microns and was "ultra-fine" as this term is used herein and used in the art of the present invention. Minex 7, Minex 10 and Minex 12 are classified as ultra-fine nepheline syenite powders and are the commercially available nepheline syenite powders to which the present invention is an improvement.

A larger nepheline syenite powder, which is greater than "ultra-fine" grade, is Minex 4 having a maximum grain size D99 of about 40 microns and a D99.9 grain size of about 60 microns. All these commercially available nepheline syenite powders define prior art to the invention and form the background to which the present invention is directed. The art is nepheline syenite powder as an area in the nepheline syenite industry. After Minex 12, with a maximum grain size D99 of about 6 microns (a size D99 of less than 10 microns) was introduced as the commercial nepheline syenite powder, it was determined that this extremely small ultra-fine nepheline syenite powder imparted substantial advantages to a large variety of commercial products including coatings, films, and inks, to name a few. These same properties are also realized by use of the present invention. To complete the background of the nepheline syenite powder art, prior U.S. patent application Ser. No. 11/803,093, filed on May 11, 2007 (UMEE 2 00075) is incorporated herein as background information for the various uses of "ultra-fine" nepheline syenite powder, which is the classification of the powder to which the present invention is directed. The present invention is an improvement and substantial advance in the art of nepheline syenite powder and in the sub-art of "ultra-fine" nepheline syenite powder which is a powder having a maximum grain size D99 of generally less than about 20 microns. In view of this background, this application relates to the specific processes used to produce a novel ultra-fine nepheline syenite powder, which novel powder is used in several applications found to be uniquely enhanced by ultra-fine nepheline syenite powder, such applications as coatings of the clear, ultra violet cured, hard, semi-transparent, and powdered types. This application discloses a novel "ultra-fine" nepheline syenite powder, the novel method of producing this novel ultra-fine nepheline syenite powder and the coatings and films using such novel ultra-fine nepheline syenite powder.

Nepheline Syenite Background Information

The present invention relates to the nepheline syenite powder art; however, before describing the advance constituting the invention of the present application, a general understanding of the nepheline syenite industry itself as evidenced by the patented technology will illustrate the difference between the general nepheline syenite industry and the specific art of the present invention, which art is commercial grade nepheline syenite powder and particularly ultra-fine nepheline syenite powder.

Standard ground nepheline syenite in particulate form has been a commercial product for many years. Indeed, nepheline syenite powder in particulated form has been used extensively to make industrial compounds and to instill enhanced properties in liquid coatings, ceramics, glass, etc. For illustrations of representative products or compounds employing standard processed particulate nepheline syenite, the following United States patents are incorporated by reference. Consequently, the general properties and procedures for using existing nepheline syenite particles need not be repeated.

| | | |
|---|---|---|
| Koenig | 2,261,884 | use as flux in ceramic |
| Lyle | 2,262,951 | color ingredient in glass |
| Thiess | 2,478,645 | porcelain glaze |
| Hummel | 2,871,132 | glazing compound |
| Huffcut | 3,389,002 | heat and corrosion resistant coating |
| Weyand | 3,486,706 | binder for grinding agent |
| Waters | 3,917,489 | ceramic flux |
| Harris | 3,998,624 | source of metalaluminum silicate |
| Brown | 4,028,289 | inorganic filler |
| Chastant | 4,130,423 | natural silicate for slag formation |
| Funk | 4,183,760 | alumina ceramic |
| Aishima | 4,242,251 | alumina silicate filler |
| Seeney | 4,396,431 | inorganic binder |
| Drolet | 4,468,473 | $SiO_2$ source |
| Shoemaker | 4,639,576 | electrode coating |
| Goguen | 4,640,797 | polymer filler |
| Vajs | 4,743,625 | vitrifying material |
| Holcombe | 5,066,330 | refractory filler |
| Kohut | 5,153,155 | nonplastic filler |
| Slagter | 6,569,923 | polymer cement |
| White | 6,790,904 | liquid coating |

Other uses of standard, ground nepheline syenite have been recently suggested. Representative examples of such newer applications of ground nepheline syenite are disclosed in the following United States patent publications:

| | | |
|---|---|---|
| Schneider | 2002/0137872 | scratch resistant coating |
| Zarnoch | 2002/0173597 | filler in resin powder |
| Fenske | 2003/0056696 | filler for polymer cement |
| Burnell | 2003/0085383 | suspending filler |
| Burnell | 2003/0085384 | heat curable resin |
| White | 2003/0224174 | filler in liquid coating |
| Schneider | 2003/0229157 | scratch resistant powder coating |
| Giles | 2004/0068048 | filler for rubber |
| Finch | 2005/0059765 | filler for plastic coating |
| Adamo | 2005/0214534 | extender for curable composition |
| Duenckel | 2006/0081371 | sintering aid |
| Schneider | 2006/0160930 | corrosion resistant coating |
| Dorgan | 2006/0235113 | filler for polymer |

Ground nepheline syenite and larger grain nepheline syenite powder are used as a filler or extender in paints, coatings, plastics and paper. It is a desirable material because it contains virtually no free silica and still functions as effectively as a free silica based filler or extender. The material is an inorganic oxide having mechanical characteristics similar to the free silica materials for which it is used as a substitute in various industries. These mechanical properties of ground nepheline syenite are realized by the use of a fine grain particulate form of nepheline syenite, which is sometimes a powder that has a grain size greater than about 15-60 microns. These known ground and powdered nepheline syenite products are quite abrasive for manufacturing equipment. Consequently, the granular nepheline syenite has a high tendency to abrade and erode quite rapidly equipment used in processing the various compounds, even compounds incorporating the fine grain powder of the prior art. It has been determined that by reducing the fine grain size of any inorganic oxide material, such as nepheline syenite, the abrasive properties of the material are reduced. It is common to provide ground nepheline syenite with a relatively small grain size for the purpose of allowing effective dispersion of the product aided by the use of nepheline syenite powder. The advantage of dispersing fine grain nepheline syenite in the carrier product is discussed in several patents, such as Gundlach U.S. Pat. No. 5,380,356; Humphrey U.S. Pat. No. 5,530,057; Hermele U.S. Pat. No. 5,686,507; Broome U.S. Pat. No. 6,074,474; and, McCrary Publication No. US 2005/0019574. These representative patent publications show fine grain nepheline syenite and are incorporated by reference herein as background information regarding the present invention. These disclosures illustrate the advantages of providing this inorganic oxide in a very fine grain size for a variety of applications. In US Publication 2005/00019574 there is a discussion that microcrystalline silica is a preferred filler in plastic. Ground nepheline syenite from Unimin Corporation, New Canaan, Conn., is thus provided as a fine grain silica deficient silicate in the form of a sodium potassium alumino silicate. The particles of this nepheline syenite are finely divided and have a grain size in the range of about 2 to about 60 microns. This widely used commercial product having this grain size and wide particle size distributions has been sold as an additive that provides the nepheline syenite properties.

SUMMARY OF BACKGROUND

In the "ultra-fine" nepheline syenite powder art, commercial grade ultra-fine powder such as Minex 7, Minex 10 and Minex 12 has been produced by controlling the maximum grain size which is defined as the D99.9 or more commonly D99. These powders have been used in a vast array of products as indicated by the applications and patents incorporated by reference herein. The newest ultra-fine nepheline syenite powder, which forms the most recent background to the present invention (but is not necessarily technical prior art) is Minex 12 having a maximum grain size D99.9 of less than 10 microns and more particularly D99 of less than about 6 microns. Minex 7, Minex 10 and Minex 12 are the ultra-fine nepheline syenite powders that are commercially available and form the general background of the present invention. Industrial grade 75 nepheline syenite powder with a maximum grain size of about 70 microns and Minex 4 with a maximum grain size D99 of about 30 microns and D99.9 of about 45 microns. These powders are not technically ultra-fine nepheline syenite powder but are a commercial nepheline syenite powder available to the public for use as the pre-process nepheline syenite powder in making the novel powder of the present invention. Prior to this invention uses of nepheline syenite powder for coating and films would only involve the commercially available nepheline syenite powders as herein disclosed and equivalents of such powders. This description of the nepheline syenite powders art constitutes general background of the present invention.

DEFINITIONS

Nepheline syenite is a rock in powder form constitutes a fine grain silica deficient silicate in the form of a sodium potassium alumino silicate. The maximum grain size as used herein is a target value defined as D95 or D99 and the minimum grain size as used herein is the target value defined as D1 or D5. The actual maximum particle size of the powder is really defined as size D99 and the minimum is the size D1. The terms "maximum" and "minimum" grain or particle sizes relate to targeted levels unless otherwise indicated. This is common usage in the small powder industry. The loading of nepheline syenite powder in a coating or film is defined as the percentage by weight of the filler in the receiving matrix.

STATEMENT OF INVENTION

The present invention relates to a hard filler for coatings and films, which filler has controlled minimum particle size i.e. such as target D5 particle size and is an "ultra-fine" nepheline syenite powder with a controlled maximum particle size. Control of the maximum size particles in the nepheline syenite powder is used to substantially reduce the abrasive properties of the filler when it is processed in the coating or film. Accurate control of the minimum size particles is used to reduce the gloss, improve clarity and reduce yellowing of the coatings or films. The nepheline syenite powder of the present invention shows low gloss or a matte finish and less abrasion to processing or application equipment. The properties of the hard filler of the present invention improve the hardness of the coating and abrasion resistance of the coating itself. These properties are the result of using the novel ultra-fine nepheline syenite powder of the present invention. When used in a coating, the novel powder of the present invention reduces gloss, increases finger print resistance especially in powder coating and increases the 60% gloss reduction. The new powder reduces gloss, but maintains clarity. Indeed, gloss for the powder with a controlled maximum grain size of 15 microns and a controlled minimum grain size of 4-7 microns reduces gloss by 50%.

The novel nepheline syenite powder of the present invention has a narrowed size between the maximum controlled grain size D95 and the minimum controlled grain size D5. This range is generally 10-12 microns, but defined as less than about 12 microns. Consequently, the grain size distribution of the ultra-fine nepheline syenite powder of the present invention and produced by the novel processes, as defined and claimed herein, impart very specific characteristics to the coating and film because of the narrow particle size distribution. Indeed, the new ultra-fine nepheline syenite powder of the present invention has a controlled maximum grain size D95 and a controlled minimum grain size D5 so that the grain size distribution between the controlled maximum grain size and the controlled minimum grain size is generally less than about 12 microns. This narrow range of grain size distribution imparts a specific and uniform physical property to the coating or film using as a filler the novel ultra-fine nepheline syenite powder of the present invention.

In accordance with the present invention, there is provided an "ultra fine" nepheline syenite powder (D99 less than about 20 microns) with a controlled minimum grain size D5 of 2-8 microns to provide a narrow particle size range less than about 12 microns. This narrow range is determined by the D99 and D1 or D5 particle sizes of the powder. In the alternative, the range is between the D95 and D5 particle size. The novel narrow range concept is the same for these definitions. The invention is an "ultra-fine" nepheline syenite powder with a controlled narrow particle size spread created by controlling either D1 or D5 particle size.

In accordance with the present invention, the "ultra-fine" nepheline syenite powder has a controlled maximum grain size as well as a controlled minimum grain size to impart a specific, very distinct characteristic to the coating or film using the novel powder of the present invention. The primary aspect of the present invention is an "ultra-fine" nepheline syenite powder having a specifically controlled minimum grain size. To give a narrow range of particles between D5 and D95 and between D5 and D99. By controlling the minimum grain size of the nepheline syenite powder, the range of distribution is made quite narrow to impart distinct and repeatable physical characteristics to coatings and films.

Control of the minimum particle or grain size D5 of the novel ultra-fine nepheline syenite powder does not include merely removing small particles often called "fines." Such small particles have a particle size of substantially less than about 1-2 microns. Control of the minimum particle size relates to the primary operation of an air classifier to remove a targeted small particle a the lower end of the particle size distribution (PSD). Particles removed by the primary function of the classifier have functional size such as 2-8 microns.

In accordance with another aspect of the present invention not only does the ultra-fine nepheline syenite powder include a controlled minimum grain size D5 of over about 2 microns, but also includes an accurately controlled maximum grain size D95 or D99. By controlling both the upper and lower grain sizes of the "ultra-fine" nepheline syenite powder, the aforementioned narrow controlled range of particle size distribution is created. This is a distinct difference over commercially available nepheline syenite powder, either of the "ultra-fine" classification or larger powders. Another aspect of the invention is the fact that the novel nepheline syenite powder with a controlled minimum grain size and/or a controlled maximum grain size is manufactured by a feedstock which is a pre-processed nepheline syenite powder, having a maximum grain size of less than about 100 microns and, indeed, in the range of 20-150 microns. Thus, the present invention involved the processing of a previously processed nepheline syenite powder, indeed, often commercially available powder. The invention is defined by these general aspects of the present invention as further limited by detail of the unique method of processing the new ultra-fine nepheline syenite powder and other limitations on the definition of the novel powder itself as defined in the appended claims. In some prior art nepheline syenite powder, the minimum particle size D5 is less than about 2 microns by removing such very small particles; however, these small sizes combined with the maximum particle size does not provide the narrow particle size distribution between D5 and D95 or D99, which narrow range defines powder made in accordance with the invention. The new powder is "ultra-fine" and has a controlled minimum particle size D5 which is greater than 2 microns to obtain the inventive narrow particle size range of less than about 12 microns.

In accordance with an aspect of the present invention, there is provided a new ultra-fine nepheline syenite powder produced from a pre-processed nepheline syenite powder feedstock having a maximum grain size D99 of less than about 100 microns. This feedstock is preferably commercial grade pre-processed nepheline syenite powder, such a powder is Minex 4, Industrial Grade 75 or larger "ultra-fine" nepheline syenite powders, such as Minex 7 and Minex 10. The novel ultra-fine nepheline syenite powder of the present invention has a moisture content of less than 0.8% by weight and a narrow particle size range D5 to D99. In accordance with the invention, this particle size distribution range is less than about 10-12 microns, i.e. less than 12 microns. Consequently, the distribution of particles is in a very narrow range to give consistent and well defined physical characteristics to coatings and films using this new ultra-fine nepheline syenite powder. In accordance with another aspect of the invention, the grain size D50 is 35-55% of the grain size D99. This narrow grain size distribution is obtained by providing a controlled minimum grain size at a target value greater than about 2 microns for a powder that is "ultra-fine." The novel nepheline syenite powder is substantially moisture free which means a moisture content of less than 1.0% and generally less than 0.8%. In the preferred embodiment the moisture content is less than about 0.4%.

In the past, nepheline syenite powder was not produced with a controlled minimum grain size that is combined with a controlled maximum grain size to produce the narrow grain size distribution of the novel powder constituting the present invention. Although controlling the minimum grain size to a level over 2 microns for an "ultra-fine" powder is a first novel feature of the invention, in practice, a second and important novel feature is controlling the maximum grain size D99 to a target value less than about 15-20 microns. Consequently, the novel "ultra-fine" powder of the present invention has a controlled maximum grain size and a controlled minimum grain size to create a powder having a very narrow well defined grain size distribution. The term "target value" is the value imparted to the minimum and maximum grain size in accordance with the practical applications of the present invention. The exact minimum and maximum grain size may vary unintentionally from the targeted value that is used to define the metes and bounds of the present invention.

In accordance with another aspect of the present invention, the novel ultra-fine nepheline syenite powder of the present invention is produced from the feedstock comprising a commercial nepheline syenite powder, which feedstock is processed by an air classifier. Indeed, the novel ultra-fine nepheline syenite powder is formed by various processes, one involving air classification, the other a series of air classifiers and the other a mill and air classifier in series constituting a continuous process. In accordance with an aspect of the present invention, the mill used in one method for producing the novel ultra-fine nepheline syenite powder is an air jet mill of the type using opposed air jets. When a series of air classifiers are used in the method for producing the novel ultra-fine nepheline syenite powder, one air classifier stage removes the upper grain size to make the powder "ultra-fine" and another air classifier stage removes the lower grain size to produce the "ultra-fine" nepheline syenite powder having a very narrow particle range between a controlled maximum value and a controlled minimum value.

The novel ultra-fine nepheline syenite powder is produced in a continuous process whereby commercial nepheline syenite powder feedstock is passed through a series of air classifier stages or a batch method wherein the commercial nepheline syenite powder feedstock is ground in an opposed jet mill and then classified internally and externally. All these various methods of producing the novel nepheline syenite powders are also independently developed inventions that have not heretofore been employed for producing the ultra-fine nepheline syenite powder of the present invention.

In accordance with a further major aspect of the present invention, there is provided a coating or film including ultra-fine nepheline syenite powder with a controlled maximum grain size D99 in the range of 10-20 microns and a controlled minimum grain size D5 in the range of about 2-7 or 8 microns. The ultra-fine nepheline syenite powder filler in the coating or film constituting this aspect of the present invention is added to the coating or film with a loading factor of 5-25% by weight of the coating or film.

Nepheline syenite is naturally occurring rock constituting a mixture of Na feldspar, K feldspar and nepheline. (NaAlSiO4). It has a low level of free silicon dioxide. This material can be described as either syenitic or syenitic feldspar. Consequently, the present invention is applicable to nepheline syenite and also to other syenitic materials having drastically low free silicon dioxide. This general description of nepheline syenite is applicable to an understanding of the present invention and is used to define the nepheline syenite rock formation constituting the material used in practicing the invention. This invention comprises a unique "ultra-fine" nepheline syenite powder, new and novel methods of making such powder, use of such powder as a filler for coatings or films and the coating or films using this novel powder.

The present invention relates to controlling particle size distribution, particle size upper limits, and particle size lower limits in systems of nepheline syenite particles. Although efforts have been undertaken in the prior art to produce nepheline syenite powders with a generally reduced particle size, as far as is known, artisans have not recognized the many benefits and physical properties that can be realized from upper and lower particle sizes, in a system of nepheline syenite particles.

The present invention provides nepheline syenite particle system exhibiting low abrasiveness. The particle system has a D50 size of 8-11 microns, a D5 size of 2-8 microns, and a D99 size of 15-19 microns, exhibiting an Einlehner value of 180-200.

The present invention provides a nepheline syenite particle system exhibiting low gloss. This particle system has a D50 size of 8-11 microns, a D1 size of 2-8 microns, and a D99 size of 15-18 microns, and exhibiting a 20 degree gloss of less than 50.

The present invention provides a method of producing a system of nepheline syenite particles having a relatively narrow particle size distribution. The method comprises providing a particulate feed of nepheline syenite particles. The method also comprises providing an attrition mill. And, the method additionally comprises processing the nepheline syenite feed in the attrition mill to thereby produce a system of nepheline syenite particles having a median particle size less than 15 microns and a relatively narrow particle size distribution, in which the difference between the D90 size and the D1 size is less than 9 microns or D99 to D5 of less than about 12 microns.

The present invention also relates to numerous products and applications made possible by use of the nepheline syenite particle systems described herein. The use and incorporation of the various particle systems described herein provide new strategies and applications for nepheline syenite systems, a syenite material or rock.

The primary object of the present invention is the provision of a filler for coatings and films, which filler is an "ultra-fine" nepheline syenite powder produced from pre-processed powder having a maximum grain size less than about 100 microns. In the new powder, the maximum or largest grain size or particle size is controlled to a given value thereby reducing abrasive properties of the filler. The lower or minimum grain size or particle size is also controlled to reduce the gloss, improve clarity and reduce yellowing in the coating or films. The ultra-fine nepheline syenite powder shows low gloss or a matte finish and less abrasion to processing or application equipment. These properties of this novel filler, produced in accordance with this primary object of the present invention improves the coating hardness and abrasion resistance of the coating and produces distinct properties in the coating or film because of the "ultra-fine" size, the controlled minimum and maximum grain size and the very narrow particle distribution between the controlled maximum level and the controlled minimum level. This range of particle size distribution is generally less than about 10-12 microns. Consequently, the novel powder constructed in accordance with the present invention has distinct and repeatable physical characteristics when incorporated into coatings and/or films.

Another object of the present invention is the provision of unique and novel methods of producing a novel ultra-fine nepheline syenite powder having controlled maximum grain size and controlled minimum grain size to produce a distinct narrow, well defined particle size distribution.

A still further object of the present invention is the provision of a filler utilizing the novel nepheline syenite powder, as defined above, which filler is employed in coatings and/or films to produce a novel coating or film with distinct physical characteristics.

Yet another object of the present invention is the provision of a novel ultra-fine nepheline syenite powder having novel controlled size distribution defined by a controlled maximum particle or grain size and a controlled minimum particle or grain size and a coating or film using this novel ultra-fine nepheline syenite powder.

Still a further object of the present invention is the provision of coatings or films utilizing the novel ultra-fine nepheline syenite powder to obtain heretofore unobtainable physical properties that are repeatable due to the controlled particle size of the novel nepheline syenite powder.

Yet another object of the present invention is the provision of method for forming the ultra-fine nepheline syenite particle powders described above. Typically, these powders are characterized by having a relatively small medium particle diameter or size and a relatively narrow particle size distribution.

Yet a further object of the present invention is the provision of an ultra-fine nepheline syenite powder that exhibits a relatively low degree of abrasiveness, thereby reducing wear of the equipment, such as processing equipment or material handling material. This novel nepheline syenite powder features a controlled grain size which obtains an Einlehner Abrasive Value of less than 200 and preferably less than 100.

Another object of the present invention is the provision of an ultra-fine nepheline syenite powder with a controlled grain size distribution that is a highly bright material usable for filler applications in clear coatings and/or as an anti-block agent in material such as polymer materials. This unique novel nepheline syenite powder can be formed into a concentrate and then dispersed into the coating or other matrix material.

Still another object of the present invention is the provision of an ultra-fine nepheline syenite powder with a controlled particle size distribution, which powder, when used for ultra violet, clear or semi-transparent coatings, results in a superior clarity compared to competitive fillers, can be used with up to 20 or 25% loading, is UV transparent, is easily dispersed into low viscosity systems and increases film hardness and scratch resistance. By the control of the particle size distribution to a low level, these properties in the coatings are unique and can be duplicated by subsequent use of the novel well defined particle size controlled ultra-fine nepheline syenite powder of the present invention.

Yet a further object of the present invention is an ultra-fine nepheline syenite powder, as defined herein, which powder, when used in a coating, retains weathering durability as does larger particle size powder, increase hardness and block resistance for kitchen and appliance application, offers higher gloss than larger grain size nepheline syenite powder while maintaining favorable physical properties and bulk density characteristics. The novel ultra-fine nepheline syenite powder has controlled particle maximum size to minimize abrasion and equipment wear and has superior cost/performance balance versus expensive "nano" fillers. The use of the novel ultra-fine nepheline syenite powder of the present invention is a cost reduction which is enhanced because of higher loading possibility.

Yet another object of the present invention is the provision of a coating containing the novel ultra-fine nepheline syenite powder that is clear, hard and resistant to scratches, and which is relatively inexpensive. Such coating is curable by exposure to ultra-violet radiation (i.e. is UV curable). Consequently, the coating using the novel ultra-fine nepheline syenite powder is readily curable and curable in a repeatable fashion due to a controlled particle size distribution of the present invention.

All of these objects and advantages and the statements of invention have been determined experimentally and tested to allow description of the physical characteristics imparted by the novel ultra-fine nepheline syenite powder to products, such as coatings and films. These properties are repeatable because of the narrow particle size distribution of the ultra-fine nepheline syenite powder and are inexpensive due to the fact that such very small nepheline syenite powder can be easily dispersed at high loading in coatings and films. Furthermore, this new powder has substantially no free silica which is another advantage of the use of the novel "ultra-fine" nepheline syenite powder. This is especially important for an ultra-fine nepheline syenite powder because such powder can become air borne during a subsequent use.

Another object is provision of an ultra-fine powder used for a filler, which filler has a controlled minimum and maximum particle size and is formed from naturally occurring rock formations.

These and other objects and advantages are part of the disclosure and will become more apparent in the following description taken together with the accompanying drawings.

BRIEF DESCRIPTION OF DRAWINGS

FIG. 6 is a table of the target particle sizes of several samples of ultra-fine nepheline syenite powder, including nepheline syenite powder in accordance with the present invention and setting forth the particle size distribution between D1 and D99.9 where the target values are D5 and D99 of the samples;

FIG. 22 is a table defining the parameters for operating the fluidized bed jet mill used in the practice of the second preferred embodiment illustrated in FIG. 21;

FIG. 23 is a table of the type disclosed in FIG. 22 illustrating the operation of the air classifier in the second preferred embodiment of the present invention showing in FIG. 21;

FIG. 24 is a specification sheet for the novel powder product by the method defined in FIGS. 20-23B.

Figure 1:
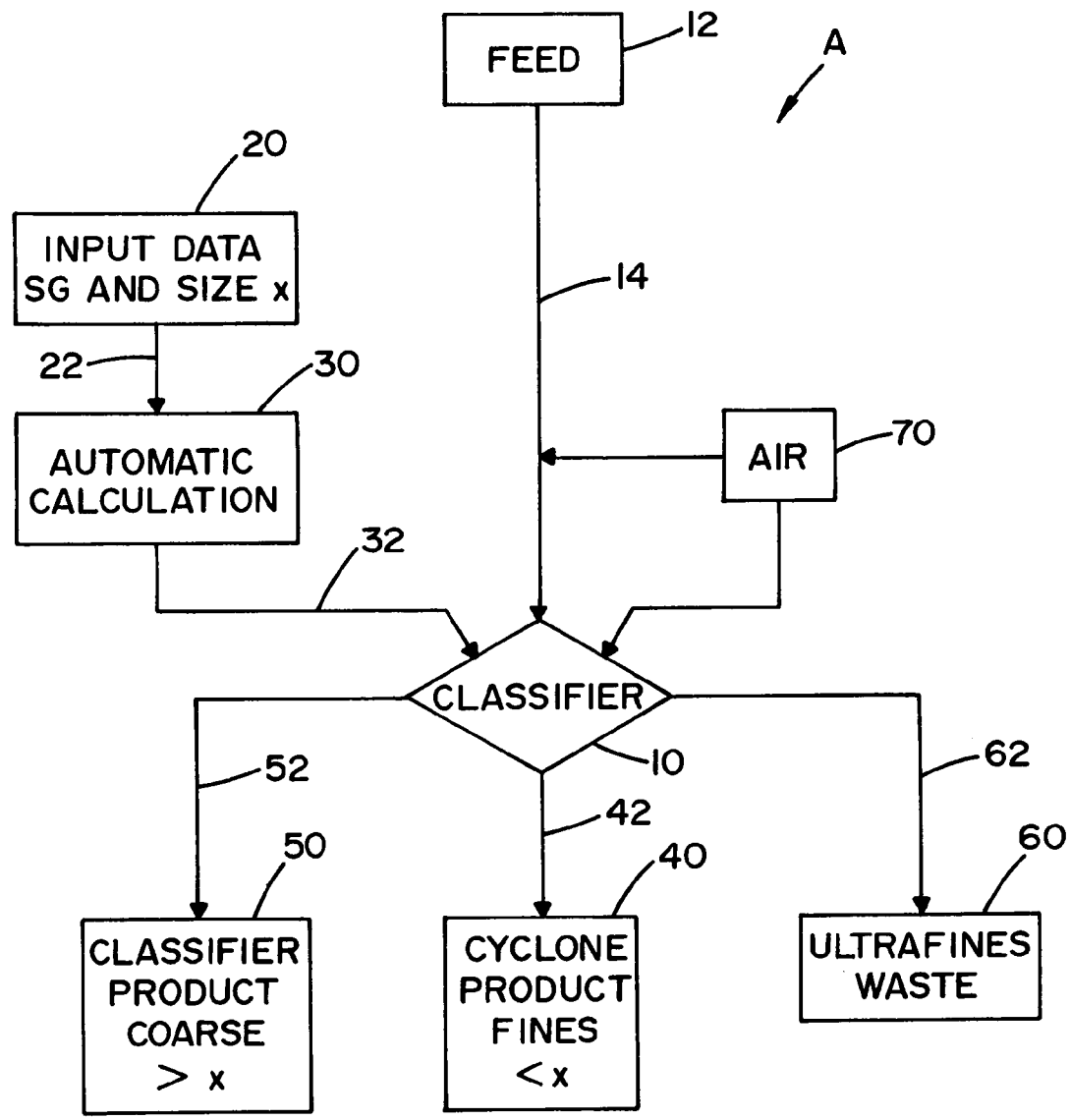
FIG. 1 is a flow chart schematically illustrating the first preferred embodiment of the method for producing the novel ultra-fine nepheline syenite powder.

Having thus defined the drawings, further features of the invention will be hereinafter described.

The advantages of the present invention, i.e. the novel "ultra-fine" nepheline powder having certain particle size distributions, are, in addition to and sometimes duplicative of, the advantages discussed in the introductory portion of the present disclosure. The disclosures establish the merit of various aspects of the present invention. Indeed, there are distinct advantages of using the nepheline syenite powder and systems described herein in certain coatings and other products. Nepheline syenite powder having a grain size of less than about 15 microns is known, but controlling the particle size distribution as described herein is not known. There was little known about the tremendous combinations of properties and characteristics to be imparted to products by the novel grain size distributions and control of particle sizes of the present invention. The concept of controlling the grain size of nepheline syenite powder, again this invention, was not pursued and the advantages were not realized until the present inventive act.

Preferred Particle Systems

It is instructive to explain certain designations and nomenclature described herein. Particle sizes, unless indicated otherwise, are given in microns, $10^{-6}$ meters. As will be appreciated by those skilled in the art, particle sizes are expressed in diameters. Although diameters imply a spherical or round shape, the term diameter as used herein also refers to the span or maximum width of a particle that is not spherical. Typically, ranges of particle sizes or size distributions are noted. For example, for a range of 2 to 10 microns, a designation of "2×10" is typically used. Also, if no lower size limit is designated for the range at issue, the collection of particles is referred to as "minus" and then the upper size limit is noted. Thus, for example, for a collection of particles having no lower size limit and an upper size limit of 5 microns, the designation "minus 5" or "−5" is used. Another designation used herein is "$D_n$," where n is some numerical value between 0 and 100. This value refers to a proportion or percentile of particles having a certain maximum diameter. For example, in a particle population having a target size of 0 to 18 microns, for instance, the median maximum diameter (D50) may be 2.5 microns, the largest diameter in the $99^{th}$ percentile of the population (D99) may be 16 microns, and the largest diameter in the $1^{st}$ percentile of the population (D1) may be 0.1 microns. These values, particularly when taken collectively, provide an indication as to the "spread" or distribution of particle sizes in the particular system. The spread is preferably between D95 and D5, but it can be between D5 and D99 or D1 and D99. The invention is a spread of less than about 12 microns using the target particle sizes however the spread is defined.

In accordance with the present invention, certain nepheline syenite particle systems with particular size distributions and characteristics have been discovered. The preferred embodiment nepheline syenite particle systems are a 2×10 system, a 4×15 system, a 5×15 system, and 6×15 system. These systems exhibit surprisingly and unexpected beneficial physical properties including, but not limited to reduced abrasiveness, reduced gloss, and increased hardness and reduce friction, lower oil absorption for higher loading and better rheology. Tables 1-4 set forth below, present typical, preferred, and most preferred values for the D1, D50, and D99 size characteristics of various preferred embodiment nepheline syenite particle systems in accordance with the present invention. All particle sizes noted are in microns.

TABLE 1

2 × 10 Preferred Embodiment Particle System

|  | $D_1$ | $D_{50}$ | $D_{99}$ |
| --- | --- | --- | --- |
| Typical | 0.2-2.6 | 2.9-4.7 | 8.1-10.9 |
| Preferred | 0.3-2.3 | 3.3-4.3 | 8.5-10.5 |
| Most Preferred | 0.8-1.8 | 3.8 | 9.0-10.0 |

TABLE 2

4 × 15 Preferred Embodiment Particle System

|  | $D_1$ | $D_{50}$ | $D_{99}$ |
| --- | --- | --- | --- |
| Typical | 0.9-3.7 | 7.9-9.7 | 14.3-17.1 |
| Preferred | 1.3-3.3 | 8.3-9.3 | 14.7-16.7 |
| Most Preferred | 1.8-2.8 | 8.8 | 15.2-16.2 |

TABLE 3

5 × 15 Preferred Embodiment Particle System

|  | $D_1$ | $D_{50}$ | $D_{99}$ |
| --- | --- | --- | --- |
| Typical | 3.3-6.1 | 8.4-10.4 | 14.6-17.5 |
| Preferred | 3.7-5.7 | 8.9-9.9 | 15.1-17.1 |
| Most Preferred | 4.2-5.2 | 9.4 | 15.6-16.6 |

TABLE 4

6 × 15 Preferred Embodiment Particle System

|  | $D_1$ | $D_{50}$ | $D_{99}$ |
| --- | --- | --- | --- |
| Typical | 3.1-5.9 | 9.1-11.1 | 16.5-19.4 |
| Preferred | 3.5-5.5 | 9.6-10.6 | 16.9-18.9 |
| Most Preferred | 4.0-5.0 | 10.1 | 17.4-18.4 |

In one aspect, the present invention relates to particle systems of nepheline syenite having particular size ranges which exhibit unique and unexpected properties. Significantly reduced abrasiveness of nepheline syenite particle systems can be obtained by using particle systems having a relatively small particle size for the upper size limit, and a relatively "tight" particle size distribution. For example, in a preferred embodiment particle system, the system has a median or D50 size of 8-11 microns, a lower or D1 size limit of 2-5 microns, and an upper or D99 size limit of 15-19 microns. This preferred embodiment particle system exhibits an Einlehner value of 180-200. In another preferred embodiment particle system, the system has a D50 size of 3-4 microns, a D1 size limit of 1-2 microns, and a D99 size limit of 9-10 microns. This system exhibits an Einlehner value of 70-90.

In another aspect, the invention relates to particle systems of nepheline syenite having particular size ranges which exhibit other unique and surprising properties. Significantly reduced gloss and frequently while maintaining clarity can be achieved by use of certain preferred embodiment particle systems described herein. A preferred embodiment particle system having a D50 size of 8-11 microns, a D1 size of 2-5 microns, and a D99 size of 15-18 microns, exhibits a 20 degree gloss of less than 50, and preferably 40-50, and a 60 degree gloss of less than 95 and preferably 80-95.

Although various particle systems have been identified and described herein, the present invention includes particle systems having controlled top and/or bottom limits.

Equipment Used to Produce Powder

A method for forming the various particle systems described herein is by use of a vertical stirred ball mill, also sometimes referred to as an attrition mill in the industry. Such a mill is commercially available from Union Process Attritor Co. in Akron, Ohio and is illustrated in U.S. patents, such as U.S. Pat. Nos. 4,850,541 and 4,979,686, which are both incorporated by reference herein.

Generally, three types of Attritors are available—a batch Attritor, a continuous attritor, and a circulation grinding Attritor.

The batch Attritor consists of a jacketed vessel filled with grinding media. Either hot or cold water or low pressure steam is run through the specially designed jacket for temperature control.

Production size Attritors are equipped with a built-in pumping system which maintains circulation during grinding for accelerated attrition and uniformity. The pump can also be used for discharging.

In the batch Attritor, the material is fed into the jacketed tank and is ground until the dispersion and desired particle size are achieved. No premix is necessary as it is accomplished in the grinding chamber. Ingredients can be added at any time. Inspection and formula corrections can be made during the grinding process without stopping the machine.

The Model 01 Attritor available from Union Process Attritor Co. is a very useful research tool for testing various formulations and grinding conditions. The lab model 1-S can be used for an accurate scale-up test machine. The most important factor is to keep the peripheral tip speed constant and the media to slurry ratio about the same. Generally in the 1-S, the media:slurry ratio is 1:¾, but in the production unit it is 1:1, therefore grinding times are somewhat longer in the larger machines, such as the 200-S and 400-S.

Another system is the continuous Attritor (C or H machine) which is best-suited for continuous, large production quantities. The continuous Attritor has a tall, narrow, jacketed tank into which a well premixed slurry is pumped in through the bottom and discharged at the top. Grids located at both the bottom and top of the machine retain the media.

The fineness of the processed material depends on the residence or "dwell time," which is defined as the length of time the material to be processed stays in the grinding chamber.

The dwell time is controlled by the pumping rate. The slower the pumping rate, the longer the dwell time, and hence the finer the grind.

The dwell time is calculated by dividing the void volume by the pumping rate. Void volume is the entire volume of the tank minus the media and the agitator shaft and arms. Therefore, scale-up for a "C" machine is determined by calculating the dwell time of a particular product and dividing this into the void volume of the larger unit. This is assuming the same tip speeds for both units. For quick scale-up, one can ratio the gross tank capacities.

One prerequisite of the continuous Attritor is that it needs a well mixed, uniform, homogeneous feed. Also a good metering pump is required, such as a gear or Moyno pump.

The continuous Attritor can be set up in series. By using larger media in the first unit, which is equipped with grids having larger openings, the system can accept a coarser feed size. The subsequent units can have smaller media, resulting in a finer grind.

Another system to produce novel powder uses a device called the circulation grinding Attritor (Q machine) and has been developed in the last few years. This system is a combination of an Attritor and a large holding tank which is generally 10 times the size of the attritor. The Attritor is filled with media and contains grids which, as in the continuous Attritor system, restrain the media while the slurry is allowed to pass through.

One of the essential requirements of the Q Attritor is the high circulating (pumping) rate. The entire contents of the holding tank are passed through the Attritor at least once every 7½ minutes, or about 8 times per hour.

This high pumping rate results in a faster grind and a narrower particle size distribution. This phenomenon is explained by the principle of preferential grinding. The fast pumping stream through the agitated media bed makes the Q-machine grinding chamber act as a dynamic sieve or filter, allowing the fines to pass and move quickly through, while the coarser particles follow a more tortuous path through the media bed.

With the circulation process, unlike the continuous attritor with the slurry making a single pass, the material makes many passes through the grinding chamber until the desired particle size is obtained.

Generally a gear pump is used which is a good metering pump. However, for abrasive and high viscosity slurries, a diaphragm or moyno pump is used.

It may also be preferred, in certain applications to use one or more grinding aids when forming the preferred embodiment particle systems described herein. Representative examples of such particle systems include, but are not limited to tri-ethanolamine, ethyl alcohol, acetic acid, silicone glycol surfactants, and combinations thereof. Of these, tri-ethanolamine is preferred.

Using an attrition mill produces a powder that can be used to practice the invention. The output powder is processed into a system of nepheline syenite particles having a relatively small size and a relatively narrow particle size distribution can be produced. Preferably, the resulting nepheline syenite particle system has a median, i.e. D50, size of less than 15 microns, such as for example, 9-11 microns or 8-10 microns, and a relatively narrow size distribution. For instance, the resulting relatively narrow size distribution can be indicated by determining the difference between the D90 and the D1 sizes. Preferably, the particle systems as described herein exhibit "D90-D1" differences of less than 9 microns, more preferably less than 6 microns, and most preferably less than 5 microns. In accordance with industry practice and standards, upper and lower particle (or grain) sizes are those designated D95 and D5, respectively.

Advantages in Products and Applications

It has been found that the nepheline syenite powder systems described herein dramatically reduce wear on mechanical equipment. Thus, in one aspect, the present invention provides a nepheline syenite powder with a novel particle or grain size distribution whereby it greatly reduces wear.

Nepheline syenite powder of the present invention drastically reduces wear on equipment processing the product using the novel inorganic mineral powder. By providing a grain size distribution not heretofore available for nepheline syenite powder the Einlehner Abrasive Value (EAV) is substantially less than 200 and about 100 or less. Certain powder systems described herein exhibit Einlehner Abrasive Values of 180-200; 70-90; and 15-20.

Another novel aspect of the present invention is its use to obtain properties attributed only to the novel nepheline syenite powder in various applications. The new powder has a considerably less abrasive effect on equipment than commercially available ultra fine nepheline syenite powder.

It has also been discovered that the nepheline syenite powder systems described herein are easily dispersed in resin systems, drastically reduce settling, and exhibit a high brightness. By using the powder with a particle or grain size distribution forming an aspect of the present invention, coatings can be created by controlled, specific loading of the nepheline syenite particle systems to increase clarity, increase the effect on gloss, and stability of the coating. Consequently, nepheline syenite powder with a novel particle size distribution has been found to enhance characteristics of the coatings in a manner not obtainable by larger grain nepheline syenite powder now available.

Nepheline syenite powder having larger particle or grain size has been used as a filler and/or extender in paint, coatings, plastics, rubber and other materials. The nepheline syenite powder imparts a variety of physical properties and technical enhancements to these systems, such as improved scrub and abrasion resistance in coatings. It has been discovered that the novel nepheline syenite powder having controlled particle size distribution developed as one aspect of the present invention offers surprisingly improved levels of optical performance while maintaining other critical performance properties of coating. Thus, the novel nepheline syenite powder is particularly beneficial for clear coatings and films.

The particle size material having a particle or grain size distribution as described herein has been proven successful in a coating with the powder used as a filler or extender, a clear coating, a cured coating, a wood coating, a powdered coating including clear coating, automotive clear coating, coil coating, sealants, paper laminates for pictures and other structures and inks. All of these products have enhanced physical characteristics based upon the use of the nepheline syenite powder with the novel particle size distribution.

The present invention has resulted in another group of new products that are enhanced by using nepheline syenite powder with specific size distribution with a loading of 10-25% or higher by weight. These products have used nepheline syenite of a substantially greater grain size, such as ground nepheline syenite. They have enhanced characteristics because they have a high loading of nepheline syenite powder with controlled size distributions. This class includes ultraviolet cured coating, nitrocellulose lacquer, acrylic lacquer, solvent based cured varnish, aqueous coatings such as lacquer, acrylic urethane and other urethane coatings, and 100% solids coatings. These coatings are enhanced by using the nepheline syenite powder described herein. Additional products in this class of goods improved by using the nepheline syenite powder, other than coatings, are adhesives, sealants, inks and paper laminates for simulated wood of furniture, films, coatings and other structures. They are new and novel because they use the nepheline syenite powder having a controlled particle size distribution.

In accordance with yet another aspect of the present invention, the novel nepheline syenite powder is used to provide a product from the class consisting of clear coatings, sealants, paper laminates, aqueous coatings, solvent based coatings, UV cured coatings, water based coatings with resin free pigment paste, nitrocellulose clear lacquer, acrylic lacquer, clear solvent based acid cured varnish, aqueous lacquer, acrylic urethane coating, aqueous clear PUD urethane coatings, 100% solids clear UV coatings and powder coatings. Also, the novel nepheline syenite powder is used in a "concentrate", such as a paste or predispersant that is incorporated into polymer systems used as coatings, plastics or rubber articles.

The loading or percent of powder added to the final product is carried by the concentrate into such product.

It has been discovered that the nepheline syenite particle systems described herein when incorporated into coatings or other formulations, can significantly increase the hardness and resistance of the coating. By using the powder with a particular size distribution forming another aspect of the invention, coatings can be created with controlled particle size distribution to increase block and abrasion resistance, and increase hardness, along with other characteristics.

The present invention also provides substantial physical benefits in clear coatings, powdered coatings, ultraviolet cured coatings and other applications which benefits have been realized when compared to various products using commercially available nepheline syenite powder and other commercial fillers. One of the applications that has been found to benefit substantially by the use of the novel nepheline syenite powder of the present invention is powder coatings, which may be clear or colored.

In accordance with another aspect of the present invention there is provided another group of commercial or final products including the nepheline syenite powder with a controlled particle size distribution. This group consists of clear liquid wood coating, clear liquid coating for flexible substrates, clear liquid coating for rigid substrates, nail polish, glass, metallurgical slag, refractory fillers, and pigment paste to make coatings.

A further aspect of the invention is a new product that now includes a specific nepheline syenite powder with a certain size distribution. The product is selected from the class consisting of opaque liquid coatings, coatings of less than 10 microns in thickness, inks, powder coatings, ceramic bodies, glazes, plastic fillers, rubber fillers, color concentrates or pastes and sealants. These products use the nepheline syenite powder to produce enhanced physical characteristics and properties as explained herein.

Abrasive Analysis

Nepheline syenite samples with controlled particle sizes of 4×15 microns, 5×15 microns, 6×15 microns, 2×10 microns, Blue Mountain Minex 12, and Apodaca Minex 12 were evaluated on an Einlehner abrasion tester. These results are set forth in Table 5. There was a clear correlation that a decrease in the particle top size of Minex reduced its abrasiveness. The addition of a grinding aid in processing Apodaca Minex 12 appears to have decreased the Einlehner value for this sample.

TABLE 5

Einlehner Results

| Sample | Einlehner # |
|---|---|
| Minex 4 | 329.7 |
| 4 × 15 microns | 195.6 |
| 5 × 15 microns | 177.8 |
| 6 × 15 microns | 184.3 |
| 2 × 10 microns | 80.6 |
| Blue Mtn Minex 12 | 70.4 |
| Apodaca Minex 12 | 31.9 |

Specifically, mineral fillers were tested with an Einlehner Abrasion Tester model AT-1000. This test method was done by dispersing 100 g of filler with 900 g of water to make a 1000 g slurry. The slurry was mixed at 1450 rpm with a single blade propeller for 5 minutes. The brass round test screen was washed and dried in an oven for 15 minutes at 110° C. The screen was then submerged in 2-butanol and dried again for 15 minutes at 110° C. The weight was then recorded and placed in the testing chamber. The resulting slurry was then poured into the testing chamber and the test was run at 174,000 revolutions. Once completed the slurry was dumped and the screen removed and cleaned and placed in an oven for 15 minutes at 110° C., after which it was submerged in 2-butanol and dried for 15 minutes in a 110° C. oven. The test screen was then weighed and the difference between the initial weight and final weight was noted.

The Einlehner value was calculated as the following:

$$\text{Einlehner\#} = (A-B)*1000,$$

where:
A=Initial Weight of Test Screen
B=Final Weight of Test Screen
Einlehner # is reported as mg loss at the particular revolutions used.

As shown in Table 5, as the top size of the samples became finer, the Einlehner number decreased. The 4×15, 5×15, and 6×15 samples all had virtually the same results with the difference falling within the range of experimental error. One interesting result was the difference between Apodaca Minex 12 and Blue Mountain Minex 12. The addition of the grinding aid in the Apodaca sample could account for this difference.

The particle size distributions for the samples can be found in the following Table 6:

TABLE 6

Particle Size Distributions

| | Actual Size (microns) | | | | |
|---|---|---|---|---|---|
| Sample | $D_{99.9}$ | $D_{99}$ | $D_{50}$ | $D_{25}$ | $D_1$ |
| Minex 4 | 36.0 | 30.0 | 7.2 | 3.4 | 1.0 |
| Blue Mtn Minex 12 | 6.0 | 5.0 | 1.9 | 0.9 | 0.2 |
| Apodaca Minex 12 | 6.0 | 5.0 | 2.0 | 1.3 | 0.1 |
| 2 × 10 | 10.7 | 9.5 | 3.8 | 2.6 | 1.3 |
| 4 × 15 | 17.1 | 15.7 | 8.8 | 7.0 | 2.3 |
| 5 × 15 | 17.1 | 16.1 | 9.4 | 7.5 | 4.7 |
| 6 × 15 | 18.6 | 17.9 | 10.1 | 8.0 | 4.5 |

The reduction of the top size for Minex reduces the abrasiveness of the filler as shown by the Einlehner results in Table 5. The particle systems 4×15, 5×15, and 6×15 exhibited surprisingly low Einlehner values (see Table 6), particularly when compared to Minex 4 which exhibited Einlehner value of 329.7. And, as compared to the Minex 4 sample tested and shown in Table 6, the particle systems 4×15, 5×15, and 6×15 exhibited surprisingly low Einlehner values. The particle systems 2×10 microns shown in Table 6 exhibited exceedingly low Einlehner value, i.e. 80.6.

As evidenced in Table 6, the particle systems 4×15, 5×15, and 6×15 have a median particle size of 8.8, 9.4, and 10.1 microns, respectively. And, these systems also exhibit a lower particle size or "bottom", i.e. D1, of 2.3, 4.7, and 4.5 microns, respectively. These corresponding sets of median and bottom particle sizes are comparable to the median and bottom particle size of Minex 4, which for the sample tested, exhibited a median and bottom size of 7.2 and 1.0 microns, respectively. However, the Einlehner values for the particle systems 4×15, 5×15, and 6×15 which were 195.6, 177.8, and 184.3, are surprisingly and unexpectedly much less than the Einlehner value of Minex 4 which was 329.7. This striking disparity is believed to be due to the control and selection of the upper particle size in the systems 4×15, 5×15, and 6×15. In these systems, the D99 for each was 15.7, 16.1, and 17.9 microns, respectively. These values are significantly smaller than the D99 for Minex 4 which is 30.0. Similarly, the D99.9 for the three systems 4×15, 5×15, and 6×15, are 17.1, 17.1, and 18.6, respectively. The D99.9 for the Minex 4 is 36.0.

Furthermore, it is also instructive to compare the particle system 2×10 with the Minex 12 system from Blue Mountain and Apodaca. The 2×10 system exhibited D50 and D1 sizes of 3.8 and 1.3 microns, respectively. The noted Minex 12 systems exhibited D50 and D1 sizes of 1.9, 2.0; and 0.2, 0.1; respectively. Yet the 2×10 system exhibited an Einlehner value of 80.6 which was only slightly greater than that value for the two Minex 12 systems of 70.4 and 31.9. It is surprising that the 2×10 system, having a D99 of 9.5 microns, which is nearly twice the size of the D99 size for the Minex 12 systems, 5.0; yet the 2×10 system exhibits a comparable Einlehner value.

beth Coloreye 3000. The contrast ratio is the indication of the difference in the reflectance measured over black and white. This measurement was used as an indicator of haze in a clear coating. New and novel sized nepheline syenite products were tested in a clear powder coating formulation. The sizes of the tested preferred embodiment products can be found in Table 7. Measured contrast ratios for the tested samples are provided in FIG. 11. Generally, the various preferred embodiment systems exhibited comparable or superior contrast ratios as systems of Minex 10 and 12. The effects of particle size on clarity and gloss were studied and can be found in FIG. 12 and Table 8.

TABLE 7

Size Distribution of Preferred Products
Actual Size

| Target Size | $D_{99.9}$ | $D_{99}$ | $D_{95}$ | $D_{90}$ | $D_{75}$ | $D_{50}$ | $D_{25}$ | $D_{10}$ | $D_5$ | $D_1$ |
|---|---|---|---|---|---|---|---|---|---|---|
| 2 × 10 | 10.7 | 9.46 | 7.95 | 7.05 | 5.42 | 3.79 | 2.61 | 1.93 | 1.65 | 1.29 |
| 2 × 6 | 6.54 | 5.70 | 4.92 | 4.44 | 3.60 | 2.77 | 2.11 | 1.67 | 1.47 | 1.21 |
| 4 × 15 | 17.1 | 15.7 | 14.2 | 13.2 | 11.2 | 8.82 | 6.99 | 5.78 | 5.16 | 2.33 |
| 6 × 15 | 18.6 | 17.9 | 16.1 | 14.8 | 12.4 | 10.1 | 8.02 | 6.46 | 5.72 | 4.47 |

Optical Properties Analysis

Existing and new particle size distributions were formulated in a standard clear acrylic powder coating at Reichhold Chemicals in Durham, N.C. Minex 10 and 12 were used along with new particle size ranges. The new particle size ranges tested were 2×10, 2×6, 4×15, and 6×15 microns. This was done to determine the effect of particle size on clarity and gloss. As described below, in terms of gloss reduction and clarity, the midsize ranges 4×15 and 6×15 microns performed the best and their use represent a new and novel strategy to reduce the gloss of a clear acrylic powder coating while maintaining good clarity. Previously, powder formulators had to use materials such as waxes to reduce gloss at the expense of performance. The finer sizes showed the best gloss as expected, but also had increased yellowness, which was unacceptable. The ability to lower gloss by as much as 50% while maintaining clarity with controlled particle size distributions has the potential to open new areas of application for nepheline syenite.

The fillers were compared on an equal weight basis. The formulations were premixed at 2000 rpm in a Hentchell FM-10 mill for two minutes. This is an initial grinding and mixing stage for powder coatings. This mixture was then further mixed and melted in a W&P ZSK 30 mm twin screw extruder with zone #1 at 110° C. and zone #2 at 80° C. The material exits the extruder onto chilled rollers and resembles a ribbon. This material was then ground in a Retsch Brinkman mill and sieved at −170 mesh. The 170 material was then used as the paint material. The coatings were sprayed onto cold rolled steel and steel penopac panels with a target final thickness of 1.5 to 2.0 mils (0.0015-0.0020 inches). The panels were then baked at 204° C. peak metal temperature for 10 minutes.

Contrast ratio was determined by using black and white penopac panels that were coated and measured using a Mac-

TABLE 8

Gloss and Depth of Image Values for Clear Test Coatings

| | Treated Aluminum Panel | |
|---|---|---|
| | Gloss (20/60) | DOI |
| No filler (Std.) | 132/164 | 40 |
| Minex 10 | 63/112 | 0 |
| Minex 12 | 70/119 | 10 |
| 2 × 10 | 54/110 | 0 |
| 2 × 6 | 62/114 | 10 |
| 4 × 15 | 43/90 | 0 |
| 6 × 15 | 41/88 | 0 |

Figure 12:
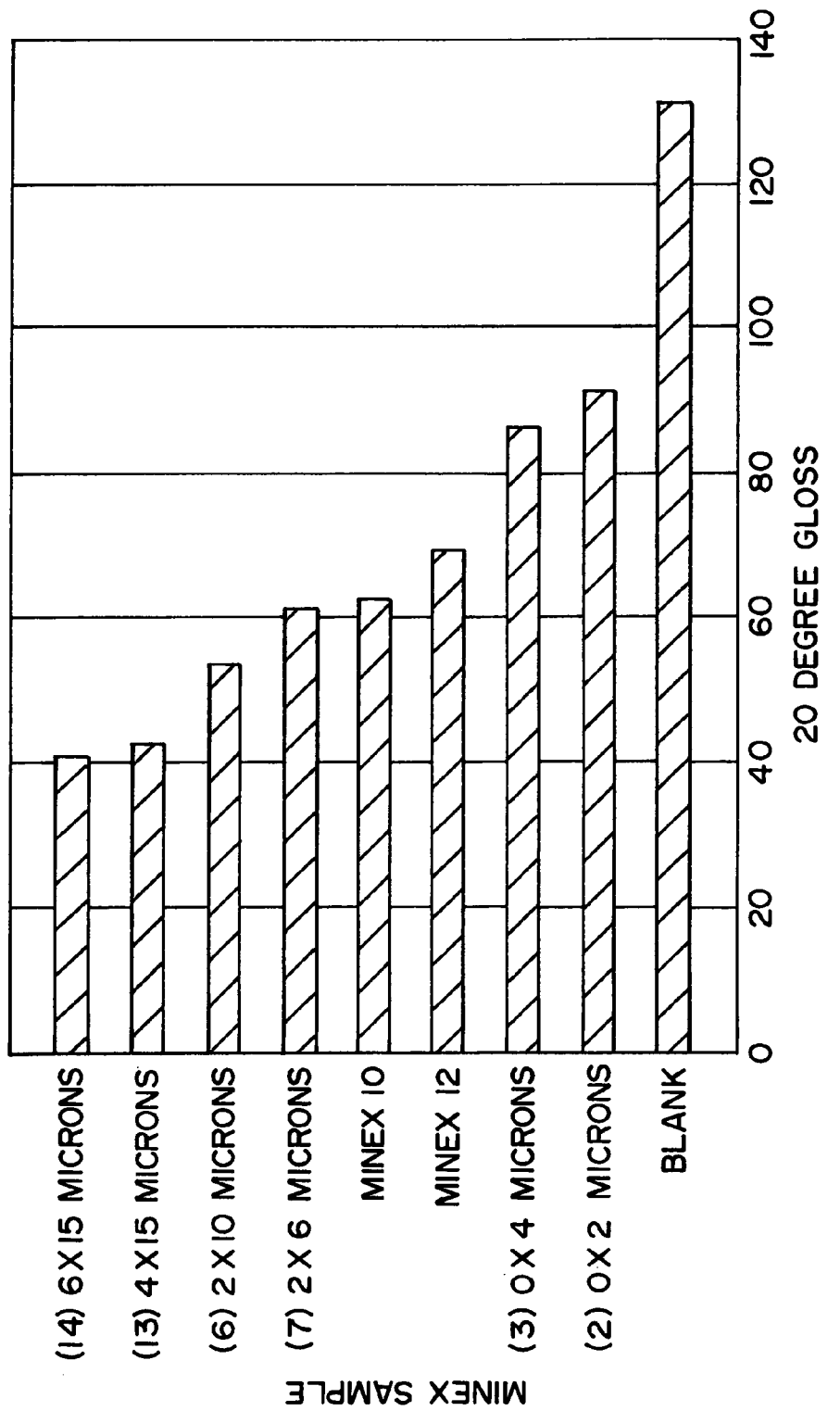
FIG. 12 is a graph of 20° gloss of powder coatings with various known and preferred embodiments of the present invention.

Referring to FIG. 12, the gloss followed generally accepted trends that the finer sizes (0×2 and 0×4 microns) will produce a higher gloss, but did show a bit of yellowing as evidenced in higher b* values from TAPPI brightness measurements. TAPPI brightness is frequently used as a measure of the reflectance of papers. The spectral and geometric conditions for TAPPI brightness are specified in TAPPI Method of Test T452, "Brightness of pulp, paper, and paperboard (directional reflectance at 457 nm)," herein incorporated by reference. The mid-range grades 4×15 and 6×15 microns gave excellent results for both clarity and gloss. In this case, a lower gloss is of benefit, as clear coatings usually have to use additives, such as waxes, to decrease the gloss. This is an important development because maintaining clarity while lowering gloss is a significant step forward for clear powder coatings. It also appears from the data with the 2×10 and 2×6 microns products that the best product for this would be a product in the 4×15 to 6×15 microns range.

All the coatings showed similar depth of image results (see Table 8) with only slight differences. As expected also, the unfilled system had the highest depth of image (DOI) reading.

In powder coatings formulations, it is usually difficult to reduce gloss and maintain clarity at the same time. However, with new and novel size fractions in accordance with the present invention, 4×15 and 6×15 microns, it was possible to maintain excellent clarity while gloss was reduced by as much as 50% from the unfilled system. For finer particle size ranges some yellowing did occur that was unacceptable in this application.

Initial Development Work on One Embodiment

A program was conducted to produce one embodiment of the novel ultra-fine nepheline syenite powder with a target maximum particle size D99 of about 15 microns and a targeted minimum particle size D5 of 5 microns. This is the 5×15 powder which is to be used as a functional filler. A production method for producing this particular embodiment of the present invention is the subject matter disclosed with respect to FIGS. 20-24 which will be described in more detail later. However, the following is a description of an initial development work for producing the novel ultra-fine nepheline syenite powder having a controlled maximum grain size D99 or D95 of about 15 microns and a controlled minimum grain size D5 of 5 microns. Consequently, in this initial program the maximum grain size is targeted at 15 microns and the minimum grain size is targeted at 5 microns. This description of an initial program will be augmented later by details of the drawings (FIGS. 20-24) describing a subsequent program resulting in a production method used to produce the "ultra-fine" nepheline syenite powder of the present invention.

In the initial development project, bulk samples of preprocessed nepheline syenite industrial grade #75 were subjected to three different types of commercial ultra-fine grinding mills. These mills and vendors are listed below.
1. VibroKinetic Ball Mill (MicroGrinding Systems, Inc., Little Rock, Ark.)
2. Fluid Bed Opposed Flow Jet Mill (Hosokawa-Alpine Micron Powder Systems, Summit, N.J.). See Konetzka U.S. Pat. No. 6,543,710 which is incorporated by reference herein.
3. Vertical Stirred Ball Mill (VSB-M) a.k.a. Attrition Mill (Union Process Attritor Co., Akron, Ohio). See Szeavari U.S. Pat. No. 4,979,686 which is incorporated by reference herein.

Each mill was used to produce two products 1) 5×15 microns with a mean particle size of 7.5 microns and 2) minus 5 microns with a mean particle size of about 1.2 microns. Distinctions in the test procedures and unique obstacles encountered are discussed below. The later powder is a controlled minimum particle size powder to limit the particle size distribution.

Test products were subjected to laser diffraction size analysis with a Beckman Coulter LS 13 320 Particle Size Analyzer. A "Nepheline Syenite" optical model was used instead of a "Fraunhofer" optical model. In addition, BET surfaces area measurements and Tappi brightness measurements of each product were made. Scanning electron micrographs, SEM, of select products were also taken.

Vibro-Kinetic Ball Mill—The VibroKinetic Ball mill was operated in closed circuit with an air classifier.

Fluid Bed Opposed Flow Jet Mill—Hosokawa-Alpine produced the −5 and 2×15 micron products by grinding to <15 microns in the Jet Mill and air classifying this product to remove the minus 5 micron material.

VSB-Mill (a.k.a. Attrition Mill)—Attrition milling can be done either wet or dry. This work was done wet, and tests were performed with two different types of attrition mills: 1) a Model 1-S Mill and 2) a Q-2 Mill. The 1-S Mill operates in a batch mode and was used to produce the finer (−5 micron) product. The Q-2 Mill operates in a circulatory mode. This means that the mill product is re-circulated from the bottom of the mill to the top. Since finer particles follow a less torturous path descending through the media, the coarser particles stay in the mill longer and are preferentially ground. A narrower particle size distribution generally results. This mill was used to produce the −15 micron product. The Union Process Attritor Co. had no means to classify −5 micron material from the −15 micron product to make a 5×15 micron product so a classifier was used.

Size distributions of the products obtained are shown in Table 9. Samples 5 and 6 exhibited a significantly "tighter" or narrower distribution than the other samples. Tappi brightness, L*, a*, b* color values, and BET surface area values are shown in Table 10.

TABLE 9

Particle Size Analyses of Processed Nepheline Syenite

| Sample | Grind | $D_{99.99}$ | $D_{97}$ | $D_{95}$ | $D_{90}$ | $D_{75}$ | $D_{50}$ | $D_{25}$ | $D_1$ | Mean |
|---|---|---|---|---|---|---|---|---|---|---|
| 1 | Vibro (−5 μm) | 26.29 | 16.48 | 14.30 | 10.29 | 4.90 | 2.32 | 1.05 | 0.42 | 3.93 |
| 2 | Vibro (−15 μm) | 61.63 | 22.72 | 18.36 | 13.22 | 6.04 | 2.34 | 0.87 | 0.37 | 5.14 |
| 3 | Jet (−5 μm) | 5.53 | 4.06 | 3.83 | 3.49 | 2.92 | 2.29 | 1.71 | 1.10 | 2.27 |
| 4 | Jet (−15 μm) | 11.60 | 8.30 | 7.82 | 7.00 | 5.55 | 4.09 | 2.98 | 2.31 | 4.40 |
| 5 | VSB-M (−5 μm) | 2.64 | 1.81 | 1.66 | 1.43 | 0.93 | 0.52 | 0.34 | 0.26 | 0.69 |
| 6 | VSB-M (−15 μm) | 11.49 | 6.43 | 5.09 | 3.40 | 1.99 | 1.13 | 0.53 | 0.32 | 1.60 |

TABLE 10

Color and Surface Area Analyses of Ultra-Fine Products

| Sample | Grind | Tappi Brightness | L* | a* | b* | BET Surface Area |
|---|---|---|---|---|---|---|
| 1 | Vibro (−5μ) | 81.50 | 92.240 | −0.182 | 3.874 | NA |
| 2 | Vibro (−15μ) | 78.20 | 91.324 | 0.067 | 4.580 | NA |
| 3 | Jet (−5μ) | 87.80 | 94.312 | −0.066 | 0.452 | 3.5 |
| 4 | Jet (−15μ) | 87.85 | 94.075 | −0.088 | 0.511 | 2.3 |
| 5 | VSB-M (−5μ) | 92.44 | 96.625 | −0.125 | 0.743 | 17.1 |
| 6 | VSB-M (−15μ) | 88.41 | 94.660 | −0.195 | 0.996 | 19.0 |

Vibro-Kinetic Ball Mill—Neither of the products from this mill had suitable size distribution (Table 9). The top sizes were too coarse, while the overall distributions were too wide. The brightness results (Table 10) show that the material was discolored, despite the fact that several mill and cyclone liner changes were made to prevent this.

Fluid Bed Opposed Flow Jet Mill—The −5 micron product (Sample 3 in Table 9) had an appropriate top size but a greater mean particle size (2.3 microns) than the 1.2 micron value that was originally targeted. The brightness of this product was nearly 88%. The −15 micron product (Sample 4 in Table 9) had an appropriate top size but a lesser mean particle size (4.4 microns) than the 7.5, micron value that was originally targeted. The brightness of this product was also 88%.

VSB-Mill (a.k.a Attrition Mill)—Both the nominal −5 and −15 micron products (Samples 5 and 6 in Table 9) turned out to be far finer than targeted. Increased confidence in the new dispersion method, as well as the BET surface area measurements (Table 10), verified the unexpected fineness of both products. The brightness values obtained (Table 10) were greater than those obtained with the jet milled products.

The research and development project as described above resulted in a new level of know-how establishing that the novel nepheline syenite powder is obtainable by proper selection of manufacturing techniques. The reported initial research and development project resulted in a discovery of the unique process disclosed generally in FIGS. 1 and 5 and the preferred process disclosed generally in FIGS. 20-24. Selection of preferred methods was a major development in the nepheline syenite art and resulted finally in the ability to produce economically the novel nepheline syenite powder having a controlled maximum grain size and a controlled minimum grain size with a very narrow particle size distribution. It was found that this product had to have a moisture content of less than 0.8% by weight of the powder. Consequently, it was ultimately learned that the 5×15 powder could indeed be produced and more importantly produced in a manner to become a commercial ultra-fine nepheline syenite powder. The research and development program as discussed above which developed the know-how to produce the novel ultra-fine nepheline syenite powder involved discovery of the criteria that the minimum grain size of the novel powder ultimately would involve controlling the final air classifier stage to operate at a slower feed rate. Furthermore, there were other process modifications necessary for converting the selected and invented method of producing the desired nepheline syenite powder. Producing a −5 micron product would involve some changes to the air classifier. It is also contemplated that a Ball Mill could readily produce both −5 products. Smaller media would probably be needed. The mill has several systemic features that make it superior to earlier generation tumbling mills: 1) its control system, in which load cells constantly measure the media charge and load and 2) its open circuit air system, which while more expensive, increases classifier efficiency by keeping the air temperature at a lower level as well as at a higher moisture level.

Grinding Aids—

Seven (7) potential grinding aids were considered. The additives were compared with the results obtained with a control sample, in which the grinding rate was measured and the times in which a coating of particles was observed to form on the mill liner (1.5 hours) and mill media (2.0 hours) were observed. The time for particle agglomeration to occur (3.0 hours) was also noted. The findings were as follows:

Tri-ethanolamine was the best additive. It provided a far faster grinding rate than the control and no coating was observed on either the mill liner or media until after 2.5 hours of grinding. It is also the least costly additive considered and would be useful for grinding all particle size ranges. Improved air classifier efficiency is likely using this additive.

Other additives that showed promise were a mixture of ethyl alcohol and acetic acid and silicone glycol surfactant.

One additive, ethylene glycol, actually had a negative effect on grinding.

In this research and development program, the objective was to produce coating filler samples of specific, narrow particle size ranges to enable research to study the effects of particle size on gloss, flatting, and abrasion resistance, particularly in powder coatings.

Figure 5:
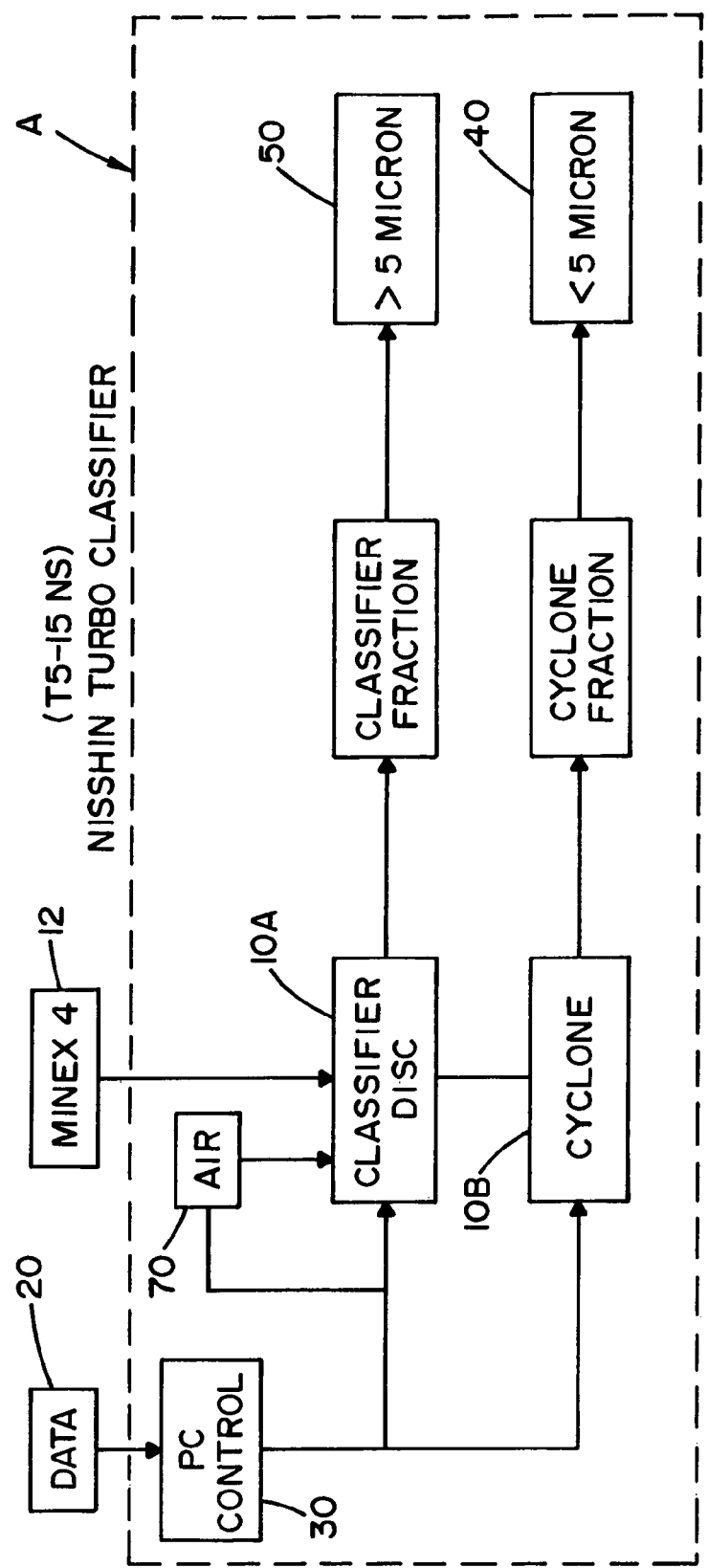
FIG. 5 is a schematic and flow chart of the method produced by the equipment schematically illustrated in FIG. 1.

Powder coatings filler samples were produced using the method of FIGS. 1 and 5. A Nissin Engineering, Inc. Model TC-15-NS Turbo Classifier, equipped with a fine rotor for classification in the very fine to ultra-fine size range of 0.5-20 microns was used. As is shown in FIG. 1, the classifier also has a microprocessor that provides automatic calculations of operating conditions. The operator enters the desired cut size (in microns) and the density ($g/cm^3$) of the mineral being classified via a touch screen panel. Then, the microprocessor calculates the classifier rotor speed (rpm) and classifier air required (in $m^3/min$). As an example, a 5 microns cut with 2.7-$g/cm^3$ nepheline syenite requires a rotor speed of 8,479 rpm and an airflow rate of 1.2 $m^3/min$). A schematic of the classification process is shown in FIGS. 1 and 5.

Figure 7:
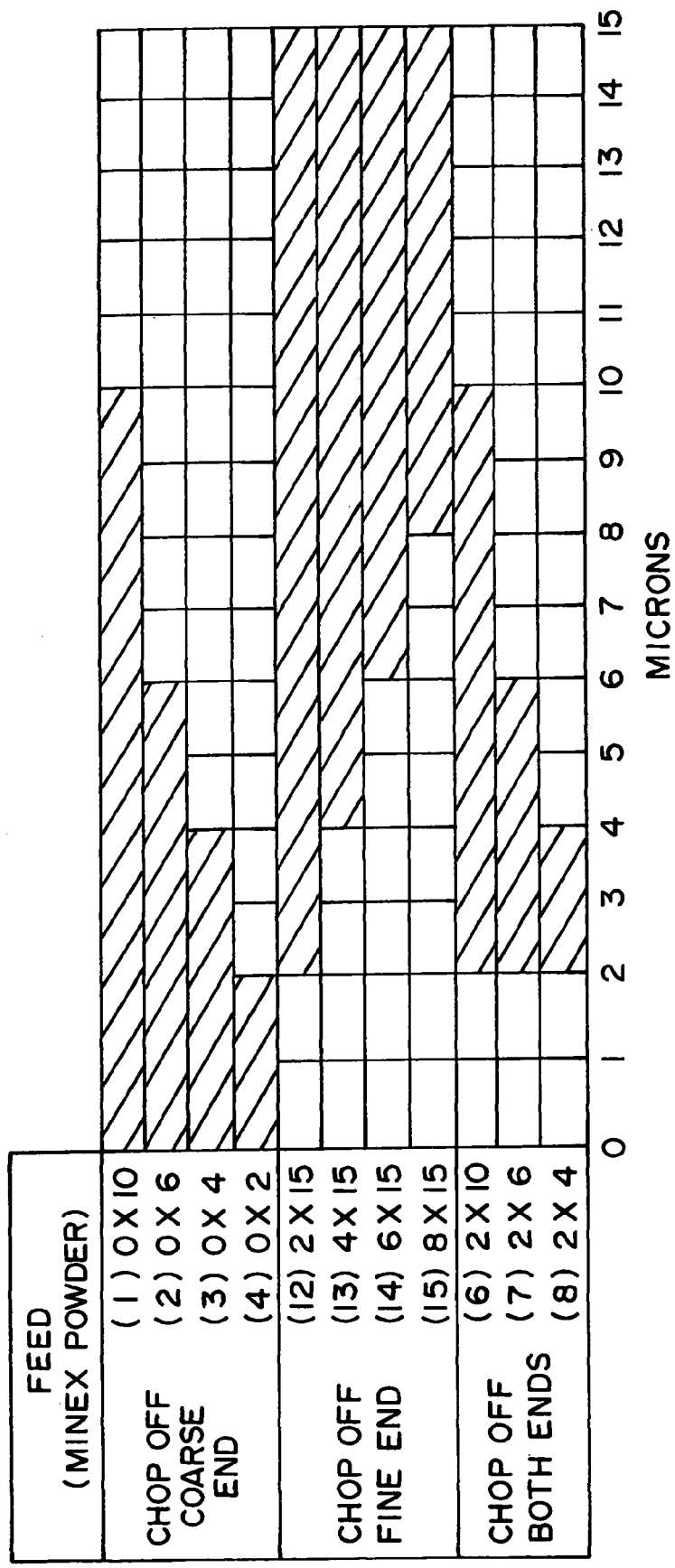
FIG. 7 is a graph illustrating nominal sizes of samples described in the table of FIG. 6 and illustrating the targeted grain sizes of the ultra-fine nepheline syenite powder samples, including novel powders of the present invention.

Eleven nominally sized distributions were produced as shown in FIG. 7.

Figure 8:
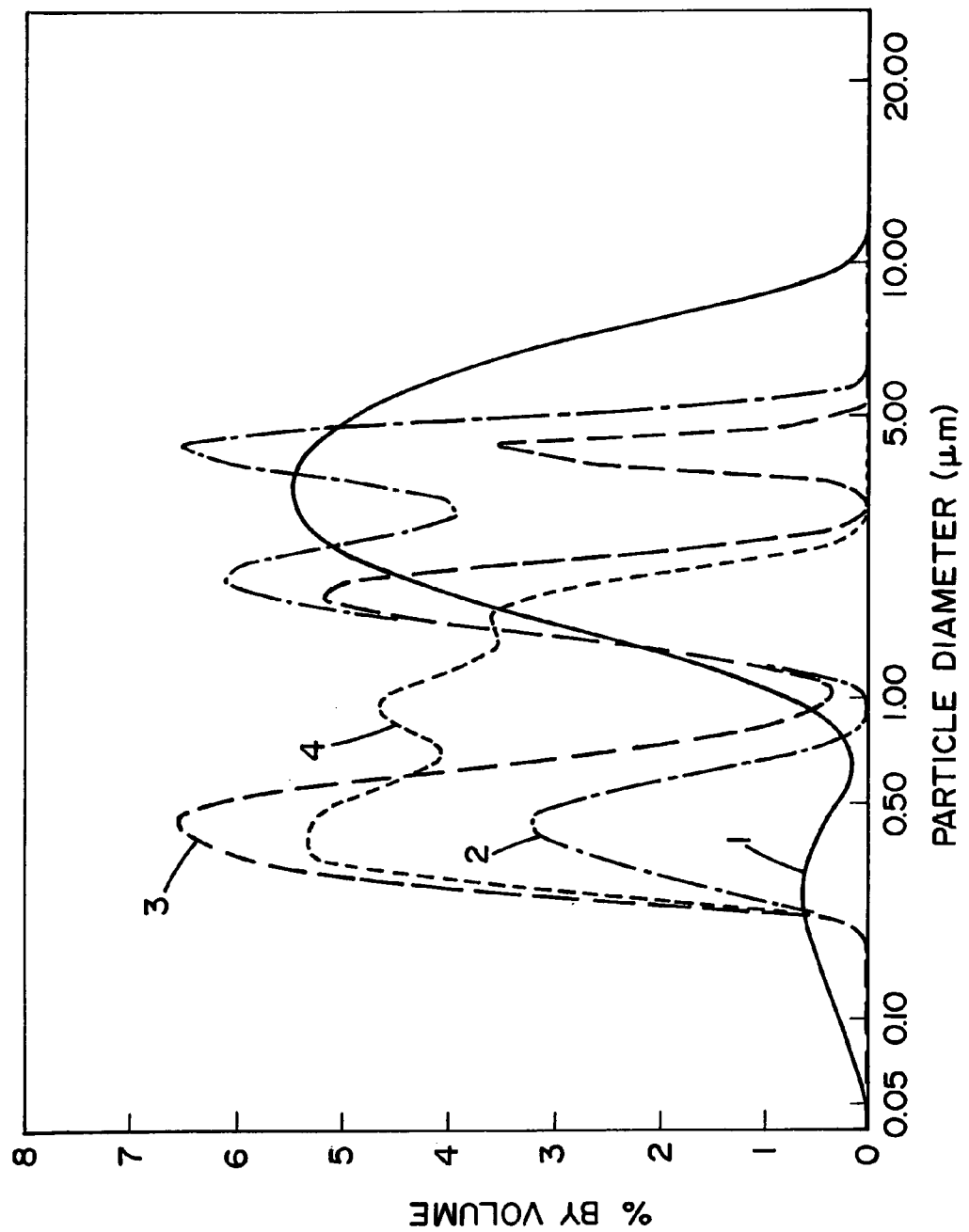
FIG. 8 is a graph of various particle size distributions of nepheline syenite particles having no controlled minimum particle size as in samples defined in the graph of FIG. 7 and the table of FIG. 6.

Particle size distribution (PSD) results of the products made with the TC-15-NS Classifier are summarized in Table 11, and grouped as follows: a) PSDs with no minimum bottom size, b) PSDs with nominal 2 microns bottom size, and c) PSDs with nominal bottom sizes of 4 microns to 6 microns. Complete PSDs of these groups are plotted in FIGS. 8-10, respectively, with corresponding Sample ID's shown.

TABLE 11

Actual Size Distributions of Targeted Products

| Group of Filler | Target Size | Actual Size | | | | | | | | | |
|---|---|---|---|---|---|---|---|---|---|---|---|
| | | $D_{99.9}$ | $D_{99}$ | $D_{95}$ | $D_{90}$ | $D_{75}$ | $D_{50}$ | $D_{25}$ | $D_{10}$ | $D_5$ | $D_1$ |
| No minimum Bottom Size | 0 × 10 | 10.5 | 8.93 | 7.44 | 6.51 | 4.79 | 3.10 | 1.90 | 0.73 | 0.25 | 0.11 |
| | 0 × 6 | 5.83 | 5.40 | 4.86 | 4.48 | 3.50 | 2.15 | 0.64 | 0.39 | 0.33 | 0.26 |
| | 0 × 4 | 5.07 | 4.63 | 4.15 | 2.41 | 1.78 | 0.58 | 0.40 | 0.32 | 0.29 | 0.25 |
| | 0 × 2 | 2.74 | 2.38 | 1.99 | 1.74 | 1.19 | 0.70 | 0.43 | 0.33 | 0.29 | 0.25 |
| Nominal 2-μm Bottom Size | 2 × 15 | 11.7 | 10.6 | 9.37 | 8.54 | 6.86 | 4.67 | 3.10 | 2.41 | 2.16 | 1.87 |
| | 2 × 10 | 10.7 | 9.46 | 7.95 | 7.05 | 5.42 | 3.79 | 2.61 | 1.93 | 1.65 | 1.29 |
| | 2 × 6 | 6.54 | 5.70 | 4.92 | 4.44 | 3.60 | 2.77 | 2.11 | 1.67 | 1.47 | 1.21 |
| | 2 × 4 | 6.25 | 5.50 | 4.63 | 4.13 | 3.24 | 2.36 | 1.65 | 1.11 | 0.31 | 0.11 |
| 4-μm to 6-μm Bottom Size | 4 × 15 | 17.1 | 15.7 | 14.2 | 13.2 | 11.2 | 8.82 | 6.99 | 5.78 | 5.16 | 2.33 |
| | 5 × 15 | 17.1 | 16.1 | 14.6 | 13.7 | 11.7 | 9.41 | 7.46 | 6.20 | 5.57 | 4.68 |
| | 6 × 15 | 18.6 | 17.9 | 16.1 | 14.8 | 12.4 | 10.1 | 8.02 | 6.46 | 5.72 | 4.47 |

The air classifier did a reasonably good job at making the target cuts. Eleven distinct samples were produced for the powder coatings studies.

The Nissin Engineering Model TC-15-NS of FIG. 1 is an excellent laboratory and small-scale pilot classifier. It is precise, accurate, and relatively easy to operate. However, the method described in FIG. 21 has been discovered to be best suited for production runs.

Preferred Embodiments

As disclosed, the invention involves a novel ultra-fine nepheline syenite powder having a very narrow particle size distribution so that distinct and repeatable physical enhancements are created in products such as, but not limited to, coatings, clear and ultra violet cured and powder coatings. Furthermore, the novel nepheline syenite powder created with a narrow particle size distribution is used for various distinctly different fillers and additives. The novel ultra-fine nepheline syenite powder has a controlled minimum particle size. This controlled minimum particle size lowers oil absorption, allows higher loadings in coatings and films, and produces better color with less yellowing and better clarity. Indeed, the embodiment of the invention having a minimum grain size of 4-6 microns and a maximum grain size of about 15 microns improves rheology.

The inventive aspect of the novel "ultra-fine" nepheline syenite powder is that the minimum particle size or grain size D5 of the produced powder is controlled preferably to a value greater than about 2 microns and preferably to a value in the range of about 2-7 microns. This control was to create a narrow particle spread of less than about 12 microns. These are target values which are used to define the product even though the minimum grain size or particle size may vary slightly from the targeted value since control of a particle size of this low magnitude results in a certain size deviation. Control of the minimum grain size to create a controlled narrow particle spread is unique. Such controlled particle size reduces gloss, improves clarity and reduces yellowing. A coating or film using the novel nepheline syenite powder having a controlled minimum grain size has a low gloss or a matte finish. These are properties of a hard filler like nepheline syenite powder that will also improve the coating or film hardness and the abrasion resistance of the coating or film. The Mohs hardness of nepheline syenite powder is in the range of 6.0-6.5 which is quite hard for fillers and imparts hardness to the coating or film. This characteristic of nepheline syenite powder together with the fact that nepheline syenite powder has virtually no free silica makes the powder quite useful in coatings and films. The usefulness is drastically improved by the present invention which controls the minimum grain size to impart the characteristics described with respect to coatings and films using the novel ultra-fine nepheline syenite powder as a filler. Such powder can be used at higher loading levels, such as 20-25% by weight, to reduce the overall cost of the coating or film. This capability is a further advantage of using the present invention. The control maximum grain size reduces the abrasive properties of the new nepheline syenite powder as it is used to enhance the physical properties of the coatings and/or films, as so far described. After extensive research and development it has been discovered that the novel ultra-fine nepheline syenite powder can be produced by two preferred types of powder production methods, as so far described and as set forth in more detail in the various drawings of this application. The first type of inventive method for producing the desired ultra-fine nepheline syenite powder of the present invention has been so far described and is illustrated in more detail in FIGS. 1-12. The type of second preferred production method has also been described generally and is presented in more detail in FIGS. 13-24.

Classification Method (FIGS. 1-12)

To produce the narrowly sized nepheline syenite powder of the present invention, the first preferred type of production method involves the use of air classifiers to control the minimum grain size of the nepheline syenite powder. Control of the minimum particle size is a new concept in the nepheline syenite powder art of the nepheline syenite industry. The initial research and development project resulted in method A using a Nissin Engineering Turbo Classifier Model TC-15-N-S as shown in FIG. 1. It was discovered that this air classifier operated in a unique manner could produce the desired nepheline syenite powders constituting the inventive aspect of the present invention. Classifier 10 is equipped with a microprocessor that calculates operating conditions based upon the mineral's specific gravity and the cut off point "x" for producing one extreme of the desired ultra-fine nepheline syenite powder. Method A disclosed in FIG. 1 utilizes the Turbo Classifier 10 in which a feedstock comprising a pre-processed nepheline syenite powder, such as a commercial powder or a powder previously processed. Indeed, the feedstock can be a prior run of the classifier. The feedstock is introduced as indicated by feedstock supply or block 12. In the preferred embodiment, pre-processed nepheline syenite powder is introduced into classifier 10 as indicated by line 14. In one operation, the initial feedstock from supply 12 through line 14 is Minex 7 having a controlled maximum particle size or grain size greater than 20 microns, but in this instance, less than about 45 microns. This pre-processed commercial nepheline syenite powder with a controlled maximum grain size is introduced into classifier 10 for a purpose of producing various nepheline syenite powder with a first run having targeted maximum particle size (D99) distribution and then a subsequent run where "x" is the targeted minimum particle size D5. This procedure produces samples (5)-(11), as shown in the first column of FIG. 6. Each of these novel ultra-fine nepheline syenite powder samples made in accordance with the present invention have a minimum particle size (D5) controlled by classifier 10 as removed from collector 40 as well as a maximum grain size produced in a prior run and removed from collector 50. This intermediate powder produced by a first run through classifier 10 is used for the minimum size run.

Method A using classifier 10 includes a data input block 20 where an operator inserts the specific gravity of the nepheline syenite powder. The maximum size D99 and then the minimum size are selectively entered as set value "x." Data from block 20 is directed through line 22 to a microprocessor stage 30. Microprocessor stage 30 sets the classifier air flow and the rotor speed of the classifier. Selected information is provided to the classifier through line 32 to operate classifier 10 for controlling first the upper and then the lower grain size of the final powder. During the first run the cyclone section of classifier 10 separated particles greater than the desired particle size value x as set by microprocessor 30. This intermediate powder is deposited into collector or block 40 through line 42. The intermediate powder with a controlled maximum particle size is removed from collector 40 and introduced into supply 12 for reprocessing by classifier 10 with set particle size "x" at the targeted minimum particle size D5. In this procedure the final novel ultra-fine nepheline syenite powder is deposited into collector or block 50 by line 52. This second operation may require more than a single pass through the classifier and the particle size value "x" may be progressively reduced. Small fines are discharged from classifier 10 into block 60 through line 62.

Classifier 10 employs a classifier disk in accordance with standard technology and a cyclone to process the feedstock entering the classifier through line 14. See English U.S. Pat. No. 4,885,832 for a representative description of this known technology. Microprocessor 30 controls the air for dispersion and for the classifier as indicated by block 70. Thus, microprocessor 30 is set for a determined particle size "x" which size is controlled by the rotating rotor disk and the cyclone of the classifier. Consequently, in practice nepheline syenite feedstock is classified by the Turbo Classifier 10 using a combination of the classifier disk and cyclone. The particle size D99 or D5 is computer controlled by adjusting the rotational speed of the disk and the air flow over the disk. When setting a specific size, D99 or D5, three factions are collected. The faction less than the set value "x" which is directed to collector or block 40. The large faction greater than the set value, is separated by the disk of the Turbo Classifier 10 and deposited "x" into collector 50. The waste faction is directed to block 60 and contains mostly very fine particles but also large particles that were not collected by the classifier disk. This waste material is discarded.

Classifier 10 is set by an operator by the data input at stage or block 20 to control the classifier disk and the cyclone air so that the set particle size "x" is separated as indicated by either block 40, 50. If the classifier is set to the desired targeted minimum particle size D5, the powder is collected at block 50. If the collected powder is to have a maximum grain size or particle size, it is either previously or subsequently passed through the classifier again and the data entered at block 20 is the maximum grain size. The powder is collected from block 40. Thus, by both a lower cut and upper cut of particle size by classifier 10, the novel ultra-fine nepheline syenite powder is produced. Method A is also disclosed in FIG. 5 wherein Minex 4 is the feedstock introduced into the feed hopper or block 12 for the first run of classifier 10A, 10B. Minex 4 has a maximum grain size controlled at about 60 microns. However, an alternate pre-processed nepheline syenite powder initial feedstock (Minex 7) with a maximum grain size of about 40 microns is also contemplated. Minex 4 and Minex 7 are not defined as "ultra-fine" nepheline syenite powder, which is a powder having a grain size less than about 20 microns. The substantial advantages of "ultra-fine" nepheline syenite powder has been recently discovered and is known in the art, especially when the ultra-fine nepheline syenite powder is used as a filler in coatings or films.

Operation of method A as described in FIGS. 1 and 5 is used to produce ultra-fine nepheline syenite powder with various targeted sizes as set forth in the novel samples (5)-(11) of FIG. 6. The targeted sizes have resulted in the actual particle size distributions recorded in table of FIG. 6. Method A is the first preferred embodiment of a type of process discovered to be useful in practicing the present invention, which invention relates to an ultra-fine nepheline syenite powder having a controlled minimum particle size D5 and, in the practical embodiments of the invention, having a controlled maximum particle size D99. Referring now to the actual particle size distribution for targeted samples (5)-(11) described in FIG. 6, there are eleven different powders samples identified as samples (1)-(11). The first four samples (1)-(4) of powders processed by method A have targeted maximum grain size D99, but have no controlled minimum grain size D5. Samples (1)-(4) can be produced by the classifier used in method A, but they do not constitute a powder within the definition of the present invention. These related samples, i.e. samples (1)-(4), have a grain size distribution recorded in FIG. 6 and shown in the curves in FIG. 8. The powder of the present invention is made by a dry process as described.

Figure 9:
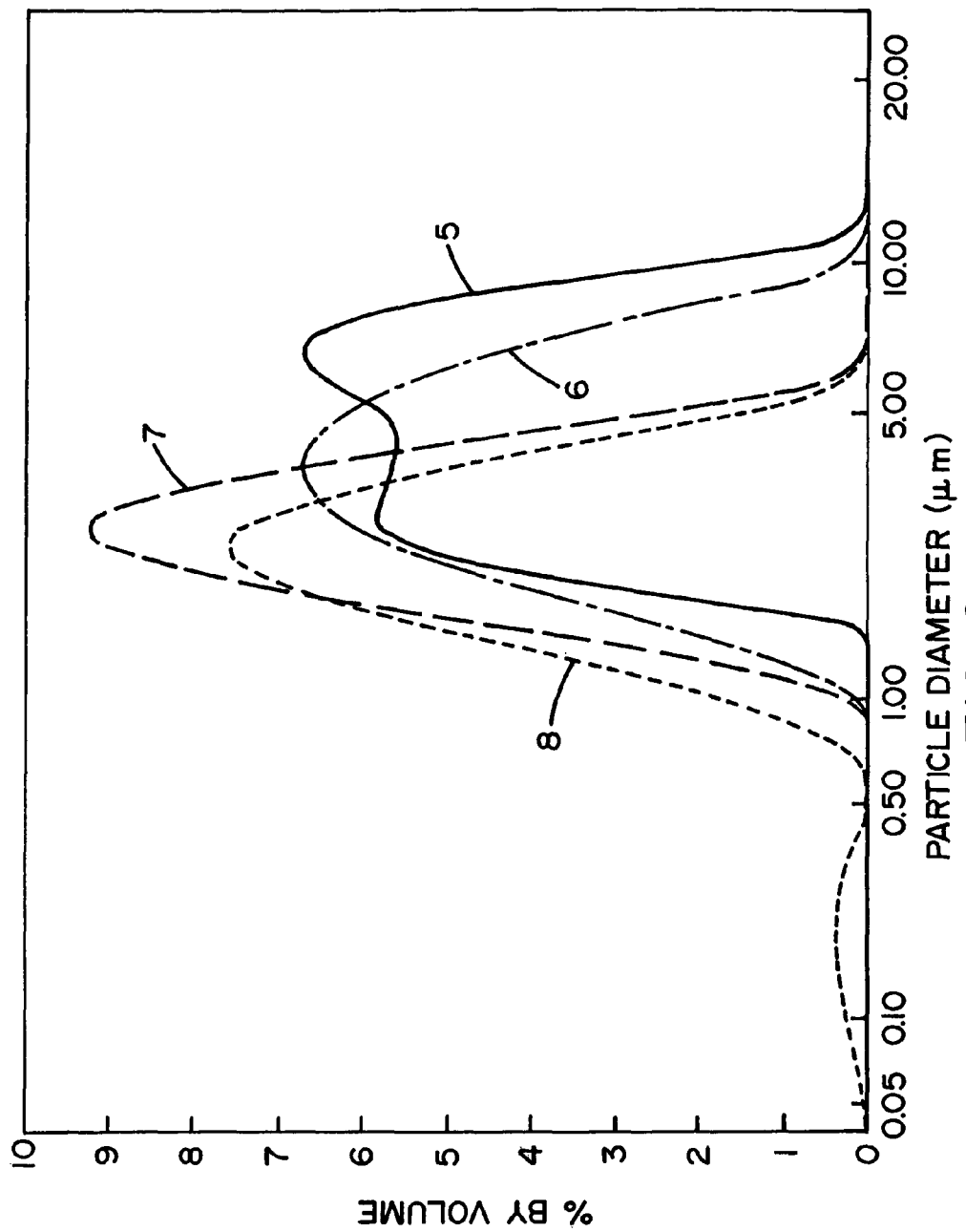
FIG. 9 is a graph of particle size distribution for samples of novel powders having nominal 2 micron minimum particle size.
Figure 10:
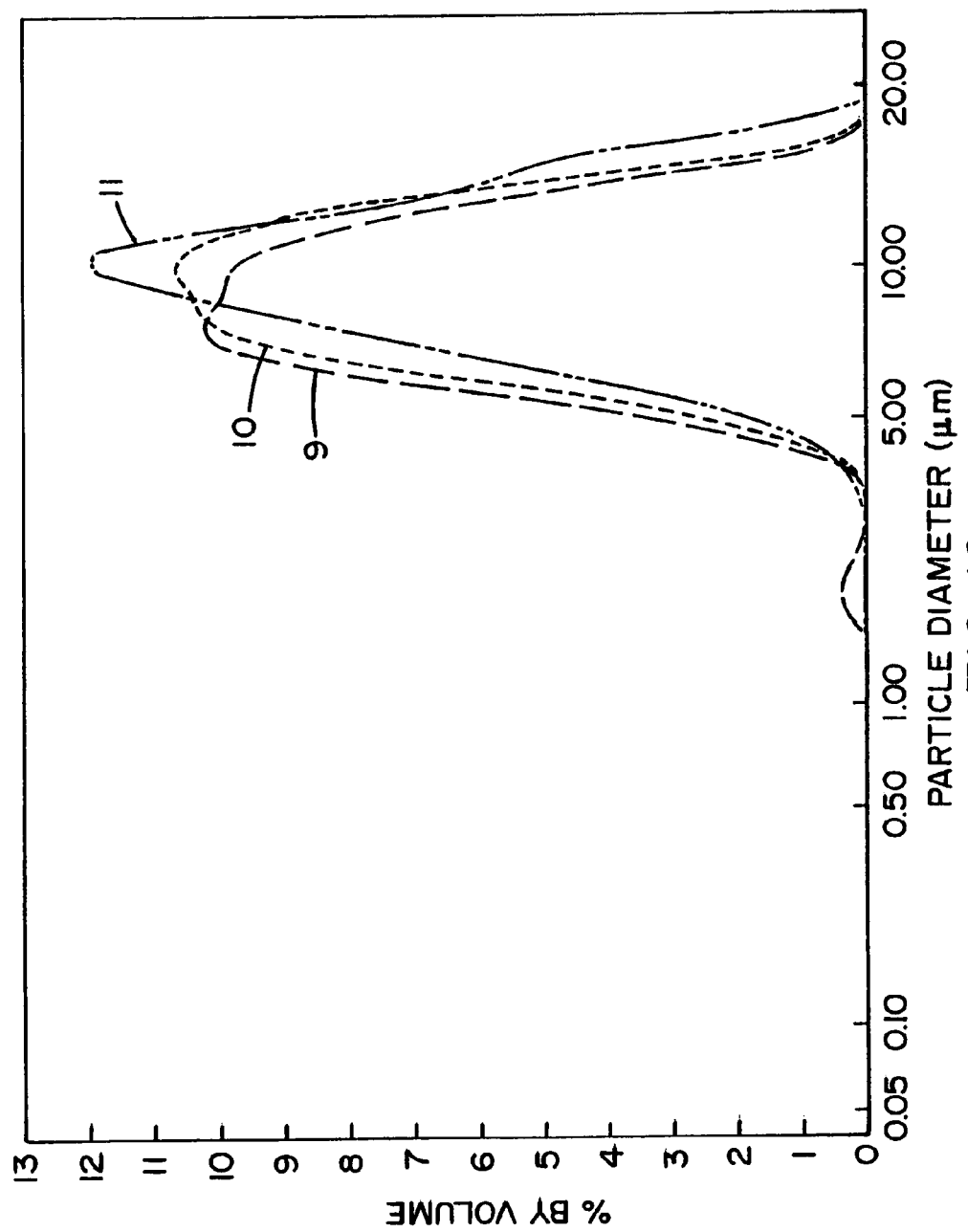
FIG. 10 is a graph similar to FIG. 9 illustrating an ultra-fine nepheline syenite powder with a controlled minimum grain size of 4-6 microns.

As indicated in this description, the broad concept of the novel ultra-fine nepheline syenite powder is control of the minimum grain size to create a narrow particle size spread. The secondary aspect of the invention is control of the maximum grain size. Samples (5)-(8) of FIG. 6 are embodiments of the novel ultra-fine nepheline syenite powder. The minimum particle size of the samples is targeted at 2 microns with the created spread of less than about 12 microns (such as example 5). However, the samples have the actual distribution set forth in table 6 and shown in the curves of FIG. 9. All of these novel nepheline syenite powders have a targeted minimum particle size D5 of 2 microns. Classifier 10 accurately controls the minimum size, but is less accurate in merely letting the powder taper randomly to a zero level at D1 as in samples (1)-(4). Samples (5)-(11) have been processed by method A to have a maximum controlled grain size D95 or D99, which is the second aspect of the invention. Controlling the top and bottom particle sizes of a sample results in control of the narrow particle size distribution of the invention. Sample (5) has a targeted maximum particle size of 15 microns. The other samples (6)-(8) have controlled minimum particle size of 2 microns and a controlled maximum grain size D95 or D99 of 10, 6 and 4 microns, respectively. These samples are shown in the curves of FIG. 9. In accordance with the preferred implementation of the invention, the minimum particle size is controlled in the general range of 4-7 microns as set forth in samples (9)-(11) of FIG. 6. However, the minimum grain size is in the range of 2-7 microns under the invention. These preferred implementations of the present invention, samples (9)-(11) have a controlled maximum particle size of about 15 microns and have the actual grain size distribution as shown in the table of FIG. 6 and in the graph of FIG. 10. In summary, the classifier 10 can be used to merely control the maximum particle size of the nepheline syenite powder as in samples (1)-(4); however, in accordance with the present invention classifier 10 is used in method A to produce an ultra-fine nepheline syenite powder where the minimum particle size is controlled to give a narrow particle size distribution, which minimum size control is an important aspect of the present invention. This novel concept of controlling the lower grain size of the nepheline syenite powder is combined with controlling the maximum particle size of the nepheline syenite powder as in samples (5)-(11). These samples have the targeted particle sizes and the actual particle size distribution provided in FIG. 6 and illustrated in the particle size distribution curves of FIGS. 9 and 10.

Another aspect of the present invention is illustrated in the table of FIG. 7 which illustrates graphically the targeted grain sizes for samples (1)-(8) identified in the table of FIG. 6. The invention involves the novel concept of controlling the minimum grain size of the nepheline syenite powder. If the incoming feedstock from hopper 12 through line 14 has very small controlled maximum grain size, such as 15 microns, i.e. (Minex 10), then narrow particle size distribution can be accomplished by targeting only the minimum grain size by the classifier of method A. This procedure is used to produce samples (12)-(15) as shown in FIG. 7. The maximum grain size is controlled, but it is merely the controlled maximum grain size of the incoming feedstock. Thus, classifier 10 is used to control only the minimum grain size as in these samples. The other samples shown in FIG. 7 have been previously described.

In summary, method A schematically illustrated in FIGS. 1 and 5 has been developed to produce the novel ultra-fine nepheline syenite powder of the present invention wherein the minimum particle size is controlled to create an ultra-fine nepheline syenite powder (a powder of less than about 20 microns) with a controlled minimum particle size to create a narrow particle size spread. Furthermore, as a secondary aspect of the present invention, the maximum grain size (D95 or D99) is also controlled to reduce the particle size of a commercial feedstock and thereby adjust and establish a narrow particle size distribution for the ultra-fine nepheline syenite powder. This narrow distribution is less than 12 microns between a maximum grain size D99, which may be established by the incoming pre-processed feedstock, and a minimum controlled particle size produced classifier 10 of method A.

Figure 2:
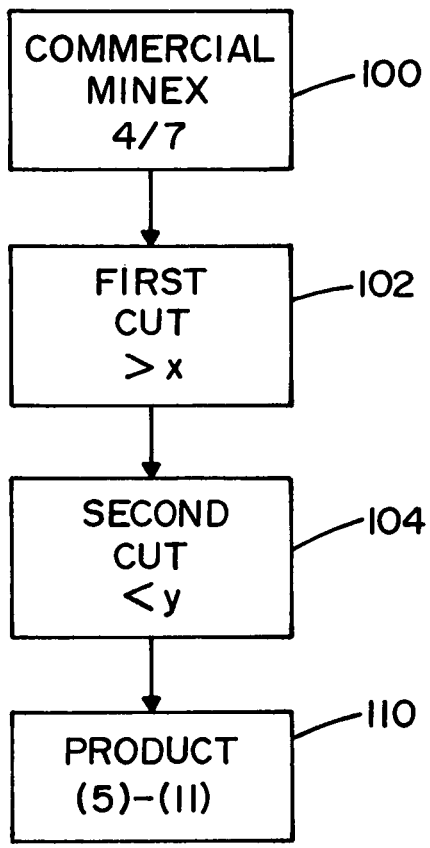
FIG. 2 is a block diagram of a method of producing the novel nepheline syenite powder from Minex 4 or Minex 7.
Figure 3:
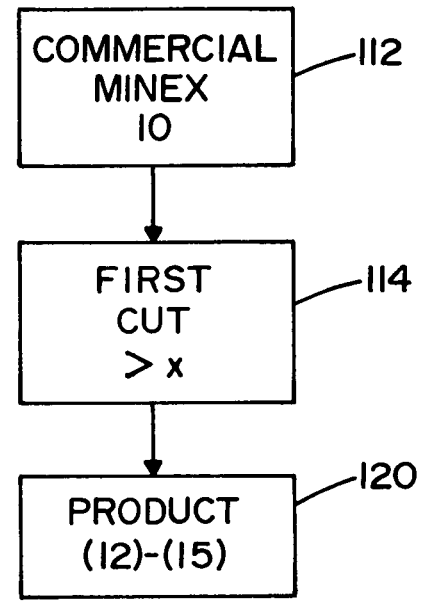
FIG. 3 is a block diagram of the method of producing one version of the ultra-fine nepheline syenite powder of the present invention where the feedstock has the desired controlled maximum particle size.
Figure 4:
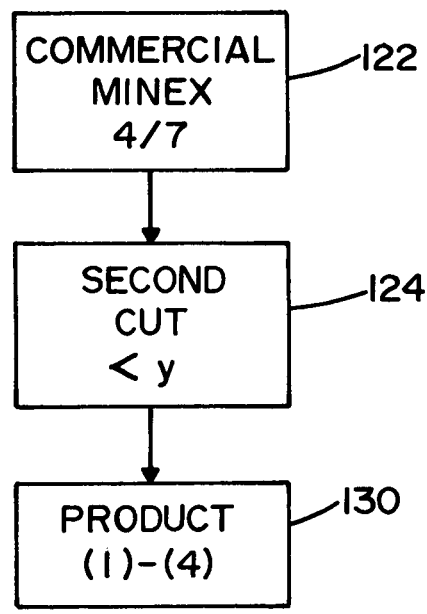
FIG. 4 is a block diagram schematically illustrating a method of producing a version of the ultra-fine nepheline syenite powder.

Method A can be operated to produce the novel ultra-fine nepheline syenite powder by performing the steps set forth in FIGS. 2 and 3. Method A, as shown in FIG. 2, is used to produce samples (5)-(11) as disclosed in FIGS. 6 and 7. A commercial grade of nepheline syenite powder having a maximum particle or grain size greater than about 30 or 40 microns is introduced as the feedstock in hopper 12 as indicated by block 100. Since this material, which may be Minex 4 or Minex 7, has a relatively large controlled maximum grain size, it is first passed through classifier 10 as indicated by block 102 to control the minimum particle size. Thereafter, it is passed through classifier 10 to control the maximum grain size as indicated by block 104. This procedure makes a powder as indicated by block 110. The two classifying stages are normally reversed. If a 15 micron controlled maximum particle size is desired for the novel ultra-fine nepheline syenite powder, the commercial, pre-processed powder Minex 10 could be used as the commercial feedstock, as shown in block 112 in FIG. 3. The feedstock has the desired maximum particle size and is merely passed through the classifier set to remove the smaller particles. The minimum particle size is established, as indicated by block 114 of FIG. 3. This procedure produces samples (12)-(15), as described in connection with FIGS. 6 and 7. The maximum grain size is controlled by the inherent maximum particle size of incoming commercial feedstock, i.e. Minex 10. The feedstock itself has the desired controlled maximum particle size of about 15 microns. Turning now to the alternative method disclosed in FIG. 4, classifier 10 is used to produce an ultra-fine nepheline syenite powder by merely removing the particle sizes above a given value. Such powder does not result in creation of an ultra-fine nepheline syenite powder with a controlled minimum particle size which is a requirement of the present invention. There is no control over the total powder as in the present invention. FIGS. 2-4 are disclosed since they represent various operations of method A to make ultra-fine nepheline syenite powder. If it is desired to remove only particle size below a minimum value, then the maximum controlled grain size is determined by the maximum particle size or grain size of the incoming commercial feedstock. Consequently, Minex 4 or Minex 7 could not be used as the commercial feedstock for such method. In this process, the commercial feedstock must have a maximum grain size sought for the final powder. This is illustrated in FIG. 3.

Figure 11:
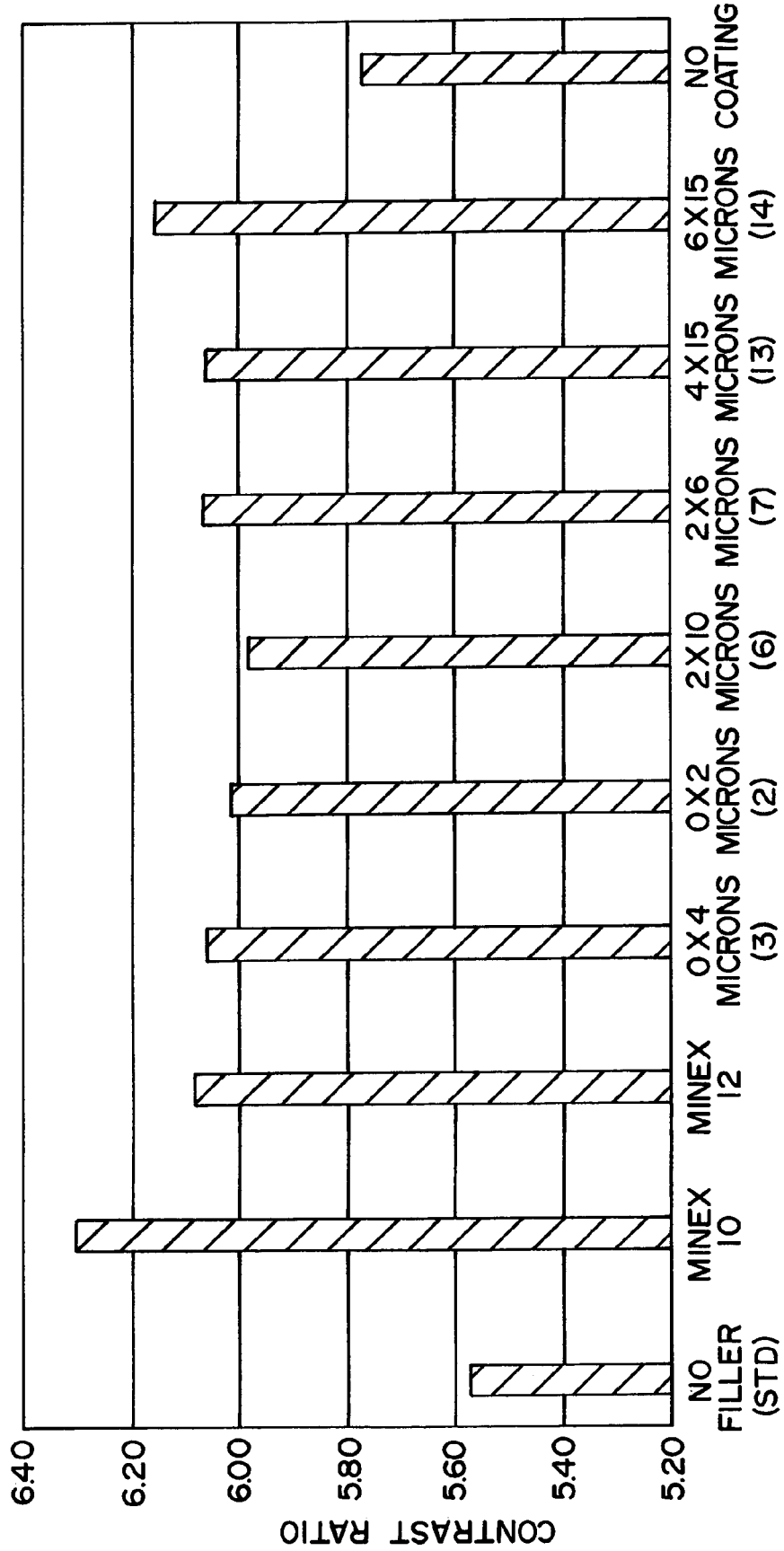
FIG. 11 is a graph of the average contrast ratio of black and white test panels having coatings with various known and preferred embodiments of the present invention.

To show properties of the invention, the nepheline syenite powder disclosed in FIGS. 6 and 7 was formulated in a clear acrylic powder coating. This is to determine the effect of the particle size of the inventive powder or clarity in gloss. In terms of gloss reduction and clarity the powder with a minimum particle size of 4 and a maximum particle size of 15 (4×15) or a minimum size of 6 and a maximum size of 15 (6×15) performed the best and represent a new and novel way to reduce the gloss of a clear acrylic powder coating while maintaining good clarity. Previously, powder forming a filler had to be combined with material, such as wax, to reduce gloss. This was at the expense of performance. The ability to lower gloss by as much as 50% while maintaining clarity with controlled particle distribution size, as in the present invention, has resulted in opening new areas of application for nepheline syenite powder. To counteract the effect of lowering gloss while maintaining clarity in acrylic powder coating, various powders having the novel features of the present invention were compared with other fillers in acrylic powder coating. Powders of the present invention were compared to the values obtained by Minex 10 and Minex 12. Minex 10 and Minex 12 are both "ultra-fine" nepheline syenite powders, but they have no control over the minimum particle size. In the test procedure, coatings with various fillers were sprayed onto cold rolled steel. Steel panels with a coating having a target final thickness of 1.5-2.0 mils were produced. The panels with the various coatings were baked at 204° C. each for ten minutes. The contrast ratio was determined by using black and white panels that were coated and measured with a Macbeth Coloreye 3000. The contrast ratio is indication of the difference in the respective measurement over black and white. This measurement was used as an indicator of the haze in a clear coating. The new and novel nepheline syenite powders were tested in a clear powder coating. The mid size powder as mentioned before gave excellent results for both clarity and gloss. As indicated, lower gloss is a benefit in clear coatings because they usually have to use additives, such as waxes to decrease the gloss. This is an important development because maintaining clarity while lowering gloss is a significant step forward for, clear powder coatings. The results of these comparisons are shown in FIGS. 11 and 12 and in Table 8 already described. In summary, the novel nepheline syenite powder maintains excellent clarity while gloss was reduced by as much as 50% from the unfilled system. It was found that these powders when used as fillers were substantially improved over those powders having no controlled minimum particle size, such as samples 2 and 3 shown in FIGS. 6 and 7. These comparisons are shown in the graphs of FIGS. 11 and 12. Thus, ultra-fine nepheline syenite powder with a controlled minimum particle or grain size greater than 2 microns maintain clarity while lowering gloss which is a drastic improvement in clear powder coatings. To be defined as "ultra-fine" a nepheline syenite powder has a maximum grain size less than about 20 microns. Consequently, an "ultra-fine" nepheline syenite powder with a controlled minimum particle size of greater than 2 microns is a nepheline syenite powder which has a controlled maximum grain size that is a value less than about 20 microns.

Milling and Classifying Methods (FIGS. 13-24)

The ultra-fine nepheline syenite powder of the present invention involves control of both the minimum particle size and the maximum particle size of a feedstock which has been converted from a pre-processed commercial powder. As discussed previously, a preferred method of producing such novel powder involves the use of an opposed air jet mill followed by a classifier or an attrition mill operated in a dry mode followed by an air classifier. The dry mill grinds the incoming pre-processed nepheline syenite powder feedstock into a powder having reduction in the maximum particle size. This is the normal operation of a mill; however, in accordance invention, the mill for reducing the maximum grain size is used to produce a powder where the maximum grain size is a value less than about 20 microns. Thus, the resulting dual processed nepheline syenite powder is "ultra-fine". This subsequently milled pre-processed powder feedstock is converted into an intermediate powder with a controlled maximum particle size. Then the intermediate powder is passed through an air classifier to obtain the targeted minimum particle size so that the resulting powder is new and is an ultra-fine nepheline syenite with both a controlled maximum particle size and a controlled minimum particle size. This process produces a narrow particle size distribution. This dual process creates a powder having the advantageous improved characteristic of the new powder. Of the many technologies investigated to produce the new nepheline syenite powder, the first preferred implementation was the classifying method A disclosed in FIGS. 1 and 5. It has been found that the preferred practical embodiment of the invention involves the use of a mill to dry grind pre-processed nepheline syenite powder feedstock having a controlled grain size substantially greater than 20 microns and less than 100 microns.

Figure 13:
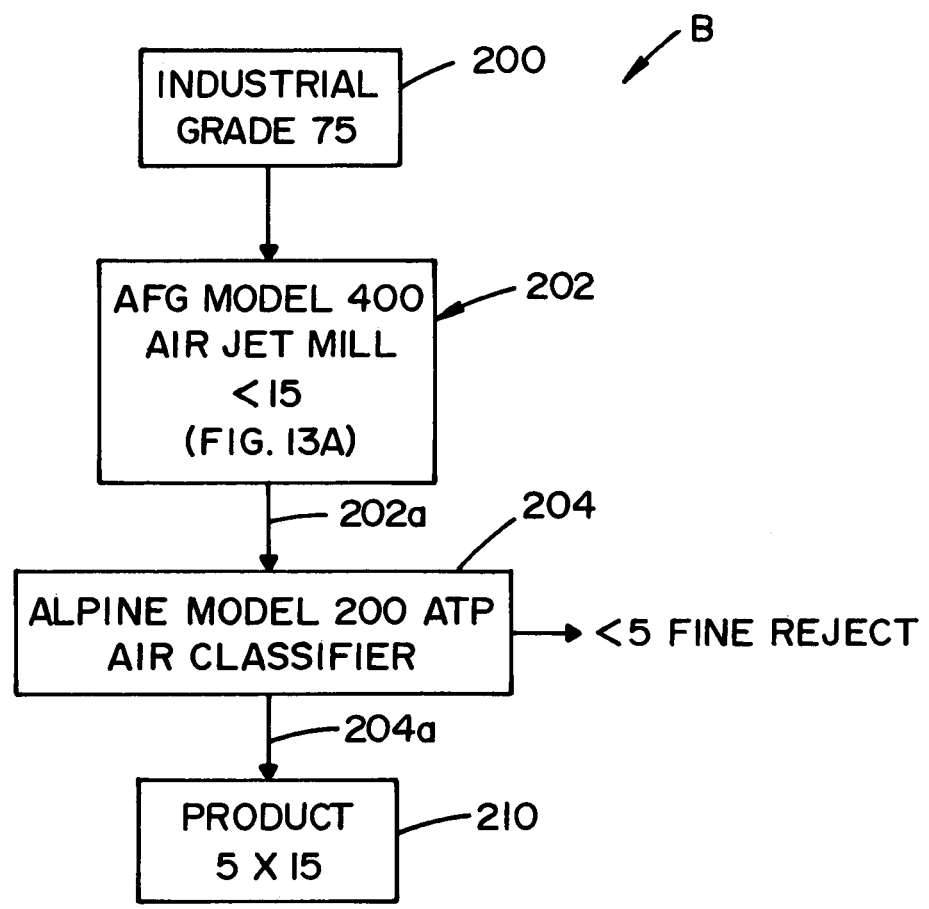
FIG. 13 is a block diagram of a second preferred embodiment of an inventive method for producing ultra-fine nepheline syenite powder having the characteristics of the novel powder of the present invention.
Figure 13A:
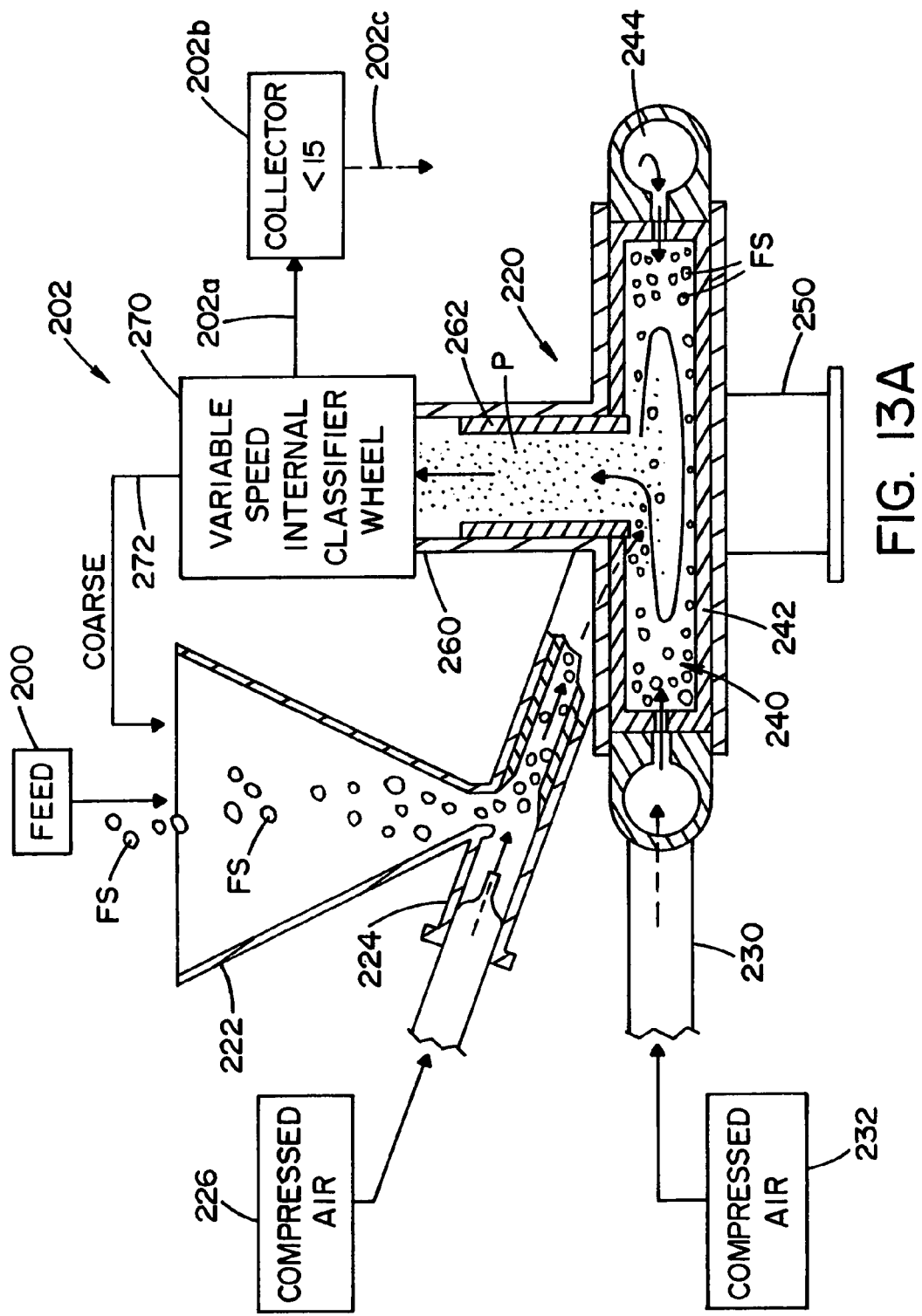
FIG. 13A is a schematic diagram of an opposed air jet mill of the type used in practicing the method described in FIG. 13.

This second preferred embodiment or practical implementation of the present invention is method B disclosed in FIG. 13. Method B involves use of Industrial Grade 75 pre-processed nepheline syenite feedstock having a controlled maximum particle size of about 60 microns, as disclosed in the graph of FIG. 21A and table of FIG. 21B. The maximum particle size D99 of this feedstock is about 60 microns to produce the controlled particle size of the nepheline syenite powder. Industrial Grade 75 has no controlled minimum particle size, but the particle size of this feedstock merely converges toward zero at D1. Method B involves the use of an opposed air jet mill from Hosokawa Alpine and sold as AFG Model 400. This opposed air jet mill 202 is the second preferred mill used in practicing the invention and is illustrated as the mill for method B shown in FIG. 13. Such mill is schematically illustrated in Zampini U.S. Pat. No. 5,423,490 and Konetzka U.S. Pat. No. 6,543,710, which are incorporated by reference herein. This fluidized bed opposed jet mill use air jet mill for grinding the feedstock. As compressed air exits internal nozzles, it is accelerated to extremely high speeds. In expanding, the energy contained in the compressed gas is converted to kinetic energy. The velocity of the air exiting the Laval nozzle or nozzles exceeds the speed of sound. The air is the grinding gas. Gas and powder from the fluidized bed is comminuted as the result of interparticle collision of the air jets, especially in the areas where opposed jets intersect. The fluidized bed opposed jet mill has a dynamic deflector-wheel classifier so the fineness of the particles is a function of the wheel speed. See Zampini U.S. Pat. No. 5,423,490 for a jet nozzle design. The feedstock is ground by mill 202 set to the targeted maximum particle size which in the illustrated embodiment is 15 microns. This opposed jet mill is disclosed in FIG. 13A and directs ground nepheline syenite powder through line 202a to an air classifier 204, which classifier, in the preferred embodiment, is an Alpine Model 200 ATP. Feedstock enters the classifier as the classifier air flows through the rotating classifying wheel. This wheel extracts fines and conveys them by air from the classifier. The coarse material is rejected by the classifying wheel and exits the lower discharge valve for the powder that has a controlled minimum particle size. This air classifier is set to remove particles having a size less than the targeted minimum particle size. Product passing through lines 204a is collected as indicated by block or collector 210. Method B is developed primarily for producing the novel ultra-fine nepheline syenite powders identified as samples (5)-(11) illustrated in FIG. 6. In the representative use of method B illustrated in FIG. 13, 5×15 sample (10) is produced. However, method B is also applicable for the other examples mentioned and, indeed, to produce the other samples of the present invention as set forth in FIGS. 6 and 7. Any powder sample having a controlled maximum particle size and minimum particle size so long as the sample is "ultra-fine" and narrow particle spread.

An opposed air jet mill performs the dry grinding function of block 202 in FIG. 13. This device is schematically illustrated as opposed air jet 220 in FIG. 13A. Mill 220 accepts pre-processed nepheline syenite feedstock from block or supply 200 and directing the feedstock into hopper 222. The feedstock has a maximum particle size previously imparted to the commercial feedstock powder. This maximum particle size is in the general range of 20-150 microns. The commercial feedstock enters mill 220 through feed hopper or funnel 222 and is then conveyed into the mill by the compressed air or gas inlet 224 from a supply of compressed air or gas 226. To grind the incoming feedstock compressed grinding air is introduced into the mill through inlet 230 connected to a compressed grinding air source 232. In accordance with this type of commercially available grinding mill, as already explained, there is a grinding chamber 240 where the feedstock is subject to high speed air jets. The chamber has a replaceable liner 242 and a grinding air manifold or recirculating air chamber 244. Ground particles having a reduced grain size from the feedstock are directed to outlet 260 surrounded by a vortex finder 262. The ground particles P are drastically reduced in size from the incoming feedstock FS. The commutation or grinding is performed by the opposed air jets in chamber 240. In one use of mill 220, the particles exiting from outlet 260 has the desired maximum particle size, i.e. the targeted D99 size. In another use of mill 220, there is a classifier set at the maximum particle size and the ground powder from outlet 260 is larger, but is subsequently classified to the desired maximum particle size. In the equipment used in method B, mill 220 has a variable speed internal classifier wheel which is adjusted to separate particle sizes less than a desired target size. The separated particles exit by gravity through line 202a into a collector 202b. Particles in line 202a shown in the illustrated embodiment of the invention have a maximum grain size of 15 microns. Particles having larger particle size, but entering into the classifier 270 from outlet 260 are directed through line 272 back into the grinding chamber with incoming feedstock FS at funnel or hopper 222. Powder from the classifier wheel enter line 202a and is deposited in collector 202b. The powder has a controlled maximum particle size. It is then bagged and introduced into air classifier 204, as indicated by dashed line 202c. The opposed air jet mill is the preferred dry mill used in practicing method B as shown in FIG. 13. An example of a run using method B will be described in detail with respect to FIGS. 20-24. However, before a disclosure of an implementation of method B shown in FIG. 13, a generic version of this method is method C illustrated in FIG. 14.

Method C uses a pre-processed commercial feedstock having a maximum controlled grain size of less than about 45 microns. This feedstock is commercially available as Minex 7 from Unimin Corporation. Feedstock from supply 300 is directed through feed line 302 into a dry mill 304. This mill can be an attrition vertical stirred dry mill in a closed circuit or, preferably, an opposed air jet mill as used in the second preferred embodiment of the invention as shown in FIG. 13. Thus, method C is a generic version and employs a dry mill 304 that produces a powder having a maximum particle size matching a selected maximum targeted particle size. This intermediate powder is transferred to line 306. The dry mill normally combined with an air classifier and having a coarse powder return indicated schematically as line 304a. As an alternative mill 304 grinds the feedstock and directs its output to an internal classifier and then to line 306. Irrespective of the dry milling step 304 of method C, the output of the dry mill and/or air classifier is the intermediate powder in line 306. This intermediate powder is directed to air classifier 308 that removes particle sizes less than the targeted minimum particle size. In the illustrated embodiment this D5 target is 5 microns. From air classifier 308, the desired ultra-fine nepheline syenite powder is directed by line 308a into a collector 310. The product is identified as a 5×15 powder having a targeted maximum particle size D99 of 15 microns and a targeted minimum particle size D5 of 5 microns. Process C is, indeed, a generic version of the preferred embodiment illustrated in FIG. 13; however, it also includes an auxiliary process operation. Minex 12 has a maximum particle size of about 6 microns. Fine nepheline syenite powder from air classifier 308 is directed through line 308b into an air classifier 322 set to remove particles greater than the maximum particle size of 5-6 microns. Thus, classifier 322 essentially directs the material from line 308b into collector 320 for subsequent use as Minex 12.

Figure 14:
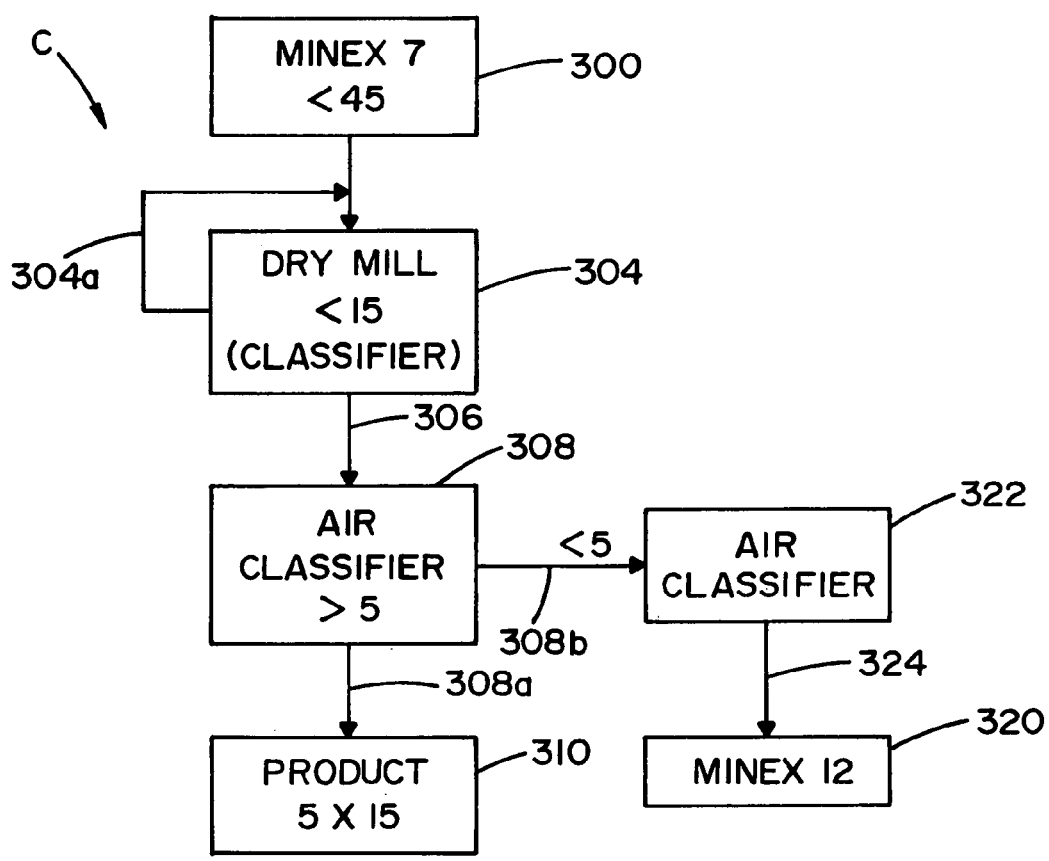
FIG. 14 is a block diagram like the diagram of FIG. 13 showing the second preferred method for producing ultra-fine nepheline syenite powder of the present invention showing use of a generic dry mill and an additional process to make Minex 12.
Figure 15:
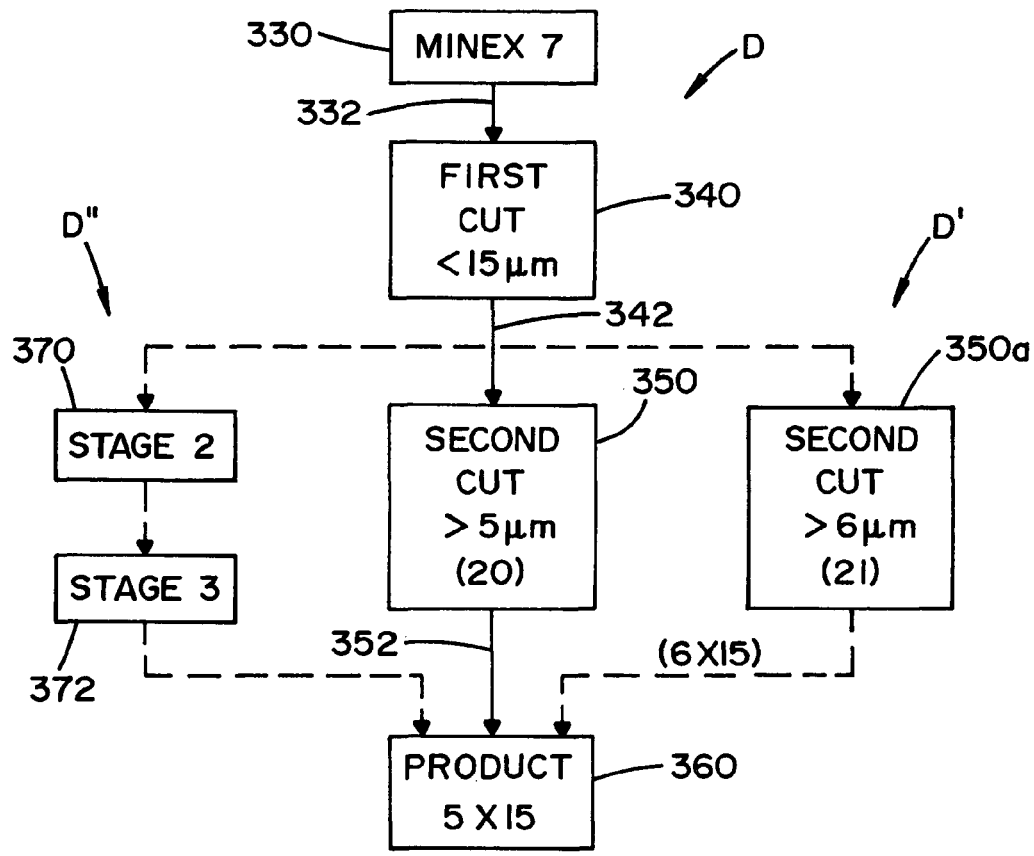
FIG. 15 is a block diagram schematically illustrating another method of producing the novel nepheline syenite powder of the present invention with a targeted grain size of 5×15 and alternatively 6×15.
Figure 16:
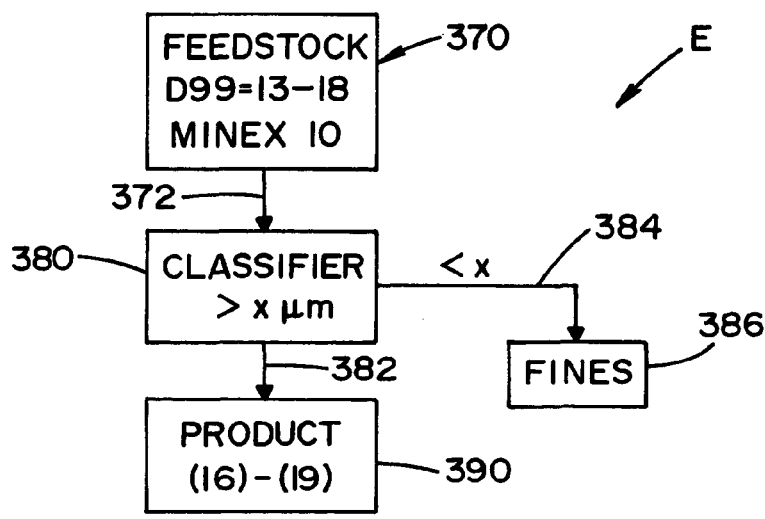
FIG. 16 is a block diagram similar to the block diagram of FIG. 14 illustrating a method for producing ultra-fine nepheline syenite powder, wherein the target grain size is 5×15 and where the powder is produced by removing only the lower particle sizes from the feedstock having a desired controlled maximum grain size.
Figure 17:
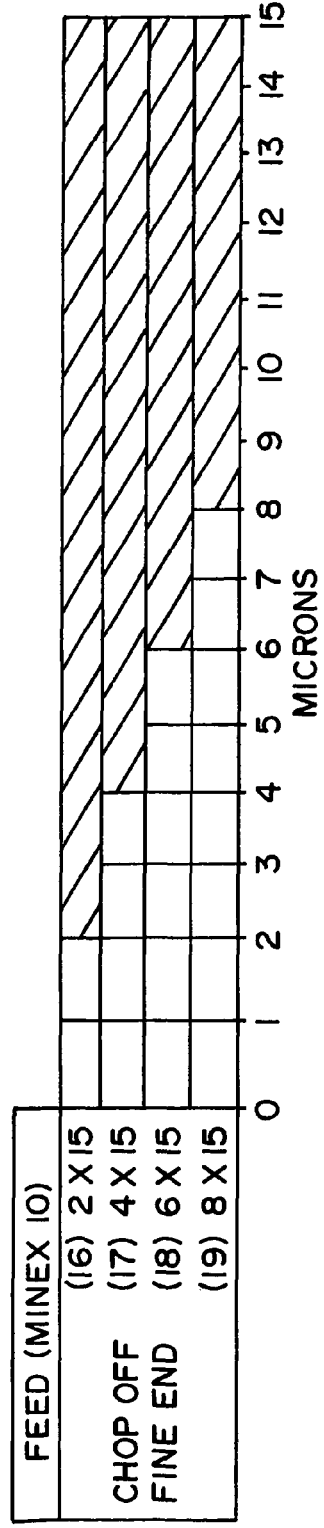
FIG. 17 is a graph representing ultra-fine nepheline syenite powders produced by the method disclosed in FIG. 16.
Figure 18:
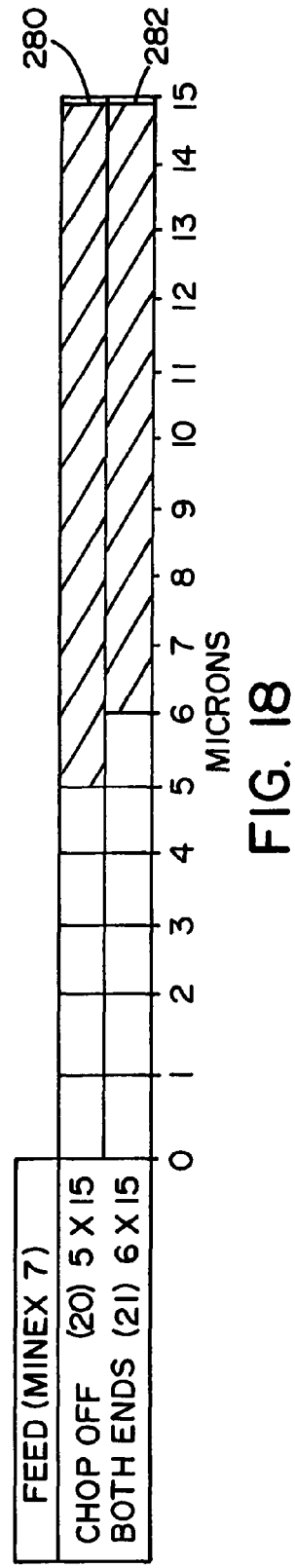
FIG. 18 is a graph similar to FIG. 17 describing ultra-fine nepheline syenite powders produced by using the method schematically illustrated in FIG. 15.
Figure 19:
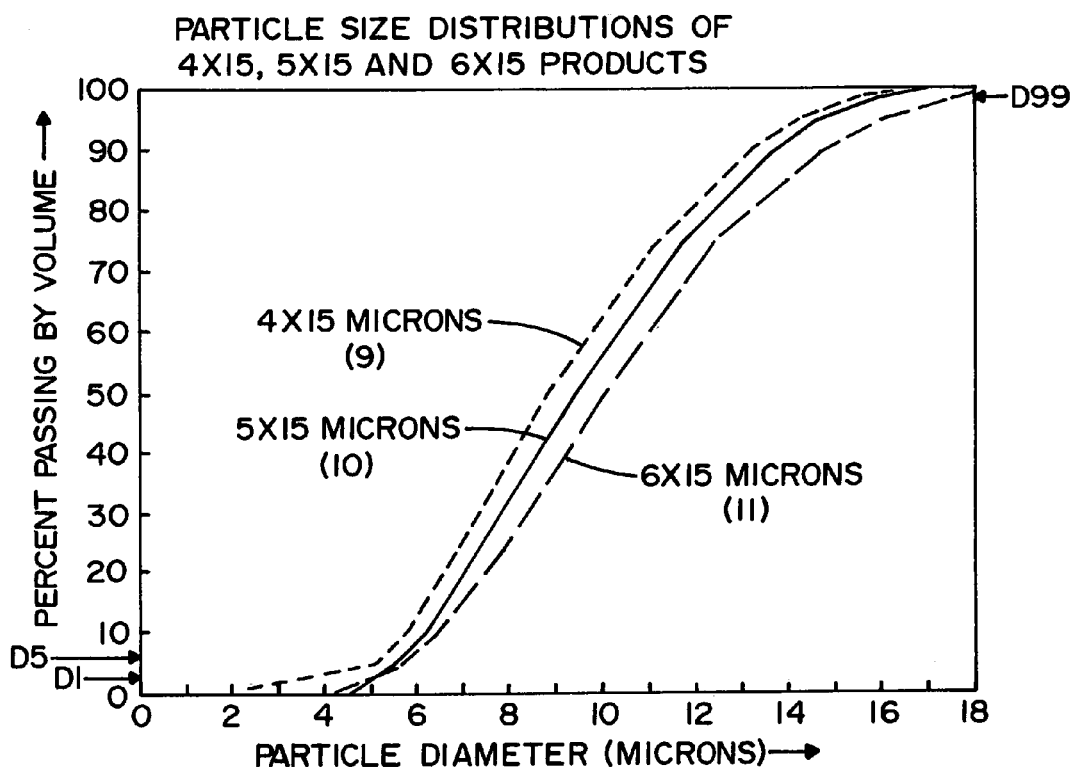
FIG. 19 is a chart showing particle size distribution curves for samples (9)-(11)
Figures 20, 21:
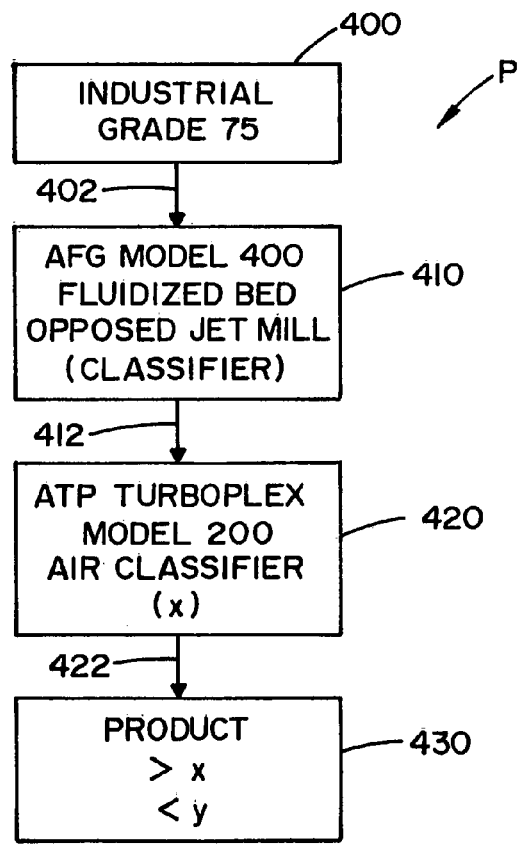
FIG. 20 is a table of particle size analysis for an ultra-fine nepheline syenite powder targeted as a 5×15 powder showing maximum and minimum particle sizes.
FIG. 21 is a block diagram schematically illustrating the second preferred embodiment of practicing the present invention like the embodiment of FIG. 13 and the practical alternative to the preferred method described in FIGS. 1 and 5.

The first and second preferred methods developed for producing the novel ultra-fine nepheline syenite powder of the present invention are the types of process used in methods A and B, the latter of which is generically disclosed as method C. For completeness, the research and development program also invented alternative methods for making the novel ultra-fine nepheline syenite powder. These alternative methods constitute further advances in the nepheline syenite powder art of the nepheline syenite industry. One alternative is disclosed in FIG. 15. Method D utilizes a pre-processed. Commercial nepheline syenite powder feedstock, such as Minex 7 having a controlled maximum particle size of about 45 microns. This commercial feedstock from supply 330 is conveyed by line 332 into a first air classifier 340 that operates in accordance with somewhat standard practice in separating from the feedstock any particle having a maximum particle size of a targeted amount, illustrated as 15 microns. This operation of an air classifier creates an intermediate powder that is conveyed through line 342 into second air classifier 350. Air classifier 350 is a second classifying stage and removes particles having a size less than the targeted minimum particle size, illustrated as 5 microns. By using the two stage air classifier concept of method D, the desired novel ultra-fine nepheline syenite powder is directed to collector 360 through line 362. By using the dual or two stage air classifier process, a desired novel nepheline syenite powder is produced and deposited in collector 360. In practice, the air classifiers 340, 350 are Alpine Model 200 ATP. Another appropriate classifier is shown in Saverse U.S. Pat. No. 4,551, 241 and English U.S. Pat. No. 4,885,832. These patents are incorporated by reference herein. Intermediate powder from line 342 is directed into the feed inlet air flow line of second air classifier 350. Consequently, the intermediate powder from the first stage air classifier 340 moves into the second stage air classifier 350. The intermediate powder is directed into the classification chamber of classifier 350 where the lighter small particles float upward into the variable speed classifier wheel and are discarded. The coarse material falls downward into a collection drum or collector 360. Thus, the product in collector 360 is a product having both the targeted maximum particle size and the targeted minimum particle size. Other aspects of the development project resulting in the present inventions are schematically illustrated in FIG. 15. Method D is modified as indicated to perform method D'. In this modified procedure, second stage air classifier 350 is replaced by second stage air classifier 350a, which is set to a different targeted minimum particle size D5. This setting has been 4 microns and the disclosed 6 microns. Another modification of method D is illustrated as method D". In this alternative method two separate classifiers 370, 380 are operated in series to gradually increase the minimum particle size of the novel powder ultimately deposited in collector 360. Methods D, D' and D" are all multiple stage classifier methods to produce the novel nepheline syenite powder as so far described and generally set forth in FIGS. 6 and 7. Method B described in FIGS. 13 and 14 is now the preferred method used for making samples with a targeted minimum particle size and a targeted maximum grain size of the type illustrated in FIGS. 6 and 7 and also specifically illustrated as samples (20) and (21) in FIG. 18. To illustrate that the maximum particle sizes is "controlled" as in methods A, B and C, samples (20) and (21) of FIG. 18 have an upper particle size cut off to a particular maximum particle size. This control of the maximum size of samples (20)-(21) is indicated by lines 280 and 282.

Powder samples (12)-(15) listed in the table of FIG. 7 have been described as powders that could be made by removal of only particles below the targeted minimum particle size D5; however, in practice these powders are actually produced by the methods that control the maximum particle size also. In other words, previously described samples (12)-(15), which were identified as controlling only the minimum particle size, are preferably produced by controlling both the minimum particle size and also the maximum particle size. Samples (12)-(15) can be made by either cutting both the top and bottom particle sizes or starting with an ultra-fine commercial powder and cutting only the bottom particle size. This latter process is indicated as samples (16)-(19) in the graph of FIG. 17. In summary, it is within the broadest scope of the present invention to produce the novel ultra-fine nepheline syenite powder with a controlled minimum particle size by starting with a pre-processed commercial ultra-fine nepheline syenite powder, such as Minex 10, having a controlled maximum particle size of about 15 microns. This is generally disclosed in FIG. 7 and specifically presented in FIG. 17. To complete this description, a method for practicing the present invention process by the act of controlling only the minimum particle size is disclosed as method E in FIG. 16. This further method involves using a specific commercial nepheline syenite feedstock, which is already "ultra-fine" and has a controlled maximum particle size in the range of 13-18 microns. Minex 10 with a controlled maximum particle size of 15-20 microns is directed from supply 370 through line 372 into classifier 380. Classifier 380 is set to remove smaller particle sizes so that the minimum particle size of the powder is controlled. Such powder is directed through line 382 into collector 390. Thus, in this particular alternative method, an ultra-fine nepheline syenite powder is merely processed by a classifier that removes all particles having a size less than x microns. In the sample illustrated in FIG. 17 the set size is 4, 6 or 8 microns. In the illustrated embodiment of this alternative method, the set particle size is 5 microns. These samples of the novel nepheline syenite powder are made by the method E. If the maximum particle size needs particle control, methods A-D are used for these samples. The preferred samples of this particular novel ultra-fine nepheline syenite powder (4×15, 5×15 and 6×15) is set forth in the curves of FIG. 19 and constituting samples (9)-(11) respectively of FIG. 6. In these curves, the D50 particle size is less than 10 microns. This provides low tendency to settle and high transparency.

Representative Run (FIGS. 20-24)

Figures 21A, 21B:
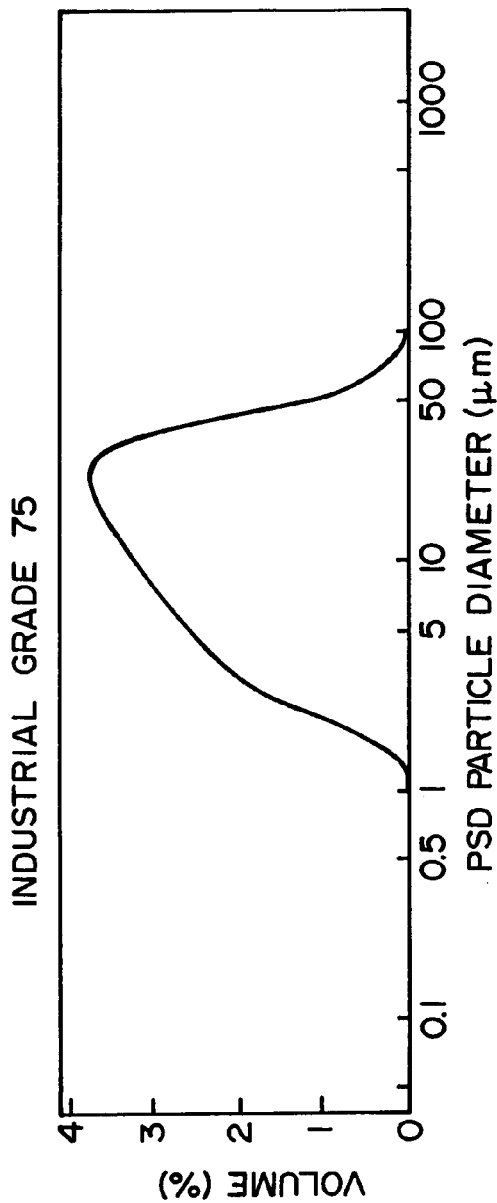
FIG. 21A is a particle size distribution curve for Industrial Grade 75 powder used in the second preferred embodiment as illustrated in FIG. 21.
FIG. 21B is a table representing the particle size distribution data set forth in the graph of FIG. 21A.

During the development of the novel concept of controlling the minimum particle size of an ultra-fine nepheline syenite powder (the powder with a "controlled" maximum particle size of less than 20 microns) several novel methods were developed and have been described. The preferred implementation of the invention uses method B disclosed in FIG. 13. A representative test run of this method was used to produce a nepheline syenite powder having a targeted maximum particle size D99 of 15 microns and a targeted minimum particle size D5 of 5 microns. The profile of the desired particle size distribution of the resulting powder is recorded in the table of FIG. 20. Method P illustrated in FIG. 21 was used in the representative run to produce an ultra-fine nepheline syenite powder having a controlled minimum particle size of 5 microns and a controlled maximum particle size of 15 microns. The feedstock was a pre-processed Industrial Grade 75 nepheline syenite powder having a controlled maximum grain size of 60-100 microns. This feedstock had no controlled minimum particle size. The particle size distribution of the commercial feedstock from supply 400 of method P is shown in the graph of FIG. 21A and disclosed in the table of FIG. 21B. This pre-processed feedstock is directed through line 402 to an AFG Model 400 fluidized bed opposed jet mill having an internal classifier, as indicated by block 410. Powder from the jet mill is directed through line 412 to an Alpine Turboplex ATP Model 200 air classifier 320. From the air classifier the desired product is conveyed through line 422 and deposited in collector 430. In this representative run of method P using the equipment set forth in FIG. 21, the targeted minimum particle size D5 was x microns, which is the setting of the air classifier 420. The controlled maximum particle size D99 is y microns, which is the outcome of the jet mill 410 of method P. In the run, x equaled 5 microns and y equaled 15 microns. The Alpine AFG Model 400 jet mill with an internal classifier produced nepheline syenite with a particle size of less than 15 microns. Subsequently, particles with a size less than 5 microns are removed by the Turboplex air classifier 420. The feedstock was manually charged into a K-Tron volumetric screw feeder, which conveyed the feedstock through the double flat valves to the grind chamber of the mill shown in FIG. 13A. Grinding was performed by three opposed jet nozzles located on the sides of the grind chamber. The three opposed jet nozzles accelerated particles using compressed air (variable pressure) to a focal point. A vertical flow of air transported the ground particles in a stream to the variable speed internal classifier wheel also disclosed in FIG. 13A. Coarse or unground particles were rejected by the classifier wheel and returned to the fluidized bed for continued grinding. Particles small enough to be accepted by the classifier were air conveyed to collector 202b shown in FIG. 13A. These particles were discharged from the dust collector by way of double flat valves. The particle size and capacity of the test run were controlled by varying the grinding air pressure, novel size bed height and classifier speed using the parameters set forth in FIG. 22. The intermediate powder in line 412 was directed to the air classifier 420 by manually charging the material into the hopper of a K-Tron. The feeder conveyed this intermediate powder through a rotary air lock directly into the feed inlet air flow line. From the air flow line the intermediate powder from the model 400 AFG jet mill was conveyed into the classification chamber of classifier 420. As the intermediate material or powder approached the classifier, a secondary rising air (GF air flow) dispersed the material to enhance the effect of the classifier. The fines, being lighter, floated upward to the classification wheel. The coarse material or powder was discharged into collection drum or collector 430. Particles small enough to pass through the variable speed classifying wheel were discarded. The particle size distribution (PSD) was determined using laser defraction (Beckman-Coulter LS 230), using Isopropyl Alcohol as the representative test run reduced the pre-processed nepheline syenite powder feedstock into a −15 micron intermediate material or powder for subsequent air classification by classifier 420. The parameters and results of the classifier stage of the test run are disclosed in FIGS. 22-24.

Figures 22A, 22B:
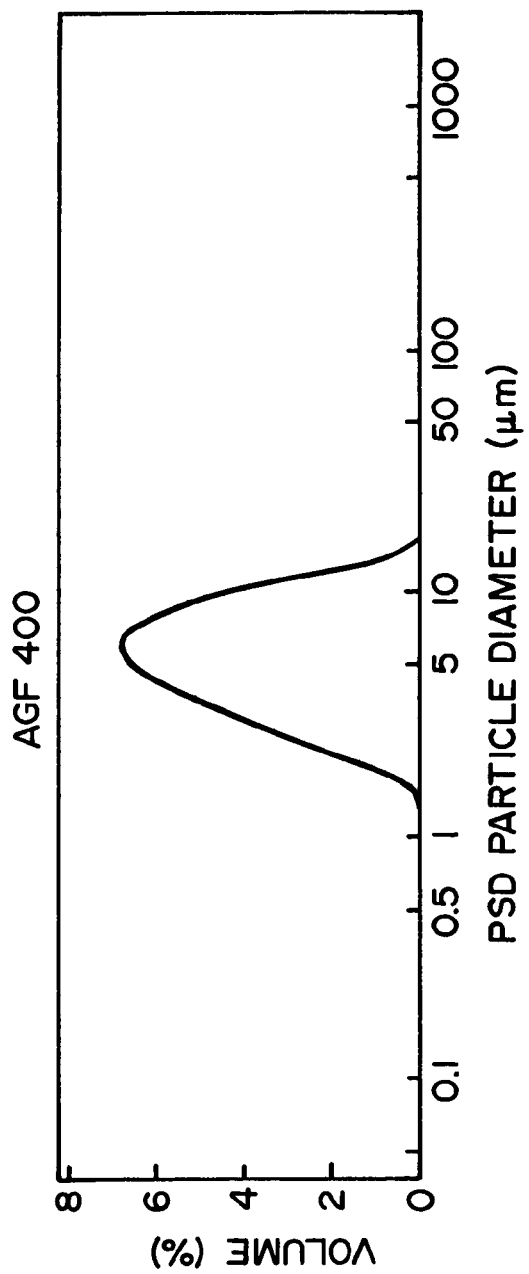
FIG. 22A is a particle size distribution curve for the output of the mill and classifier used in practicing the second preferred embodiment of the method described in FIG. 21.
FIG. 22B is a table of the particle size distribution curve as shown in FIG. 22A of the product having its maximum grain size controlled to a target size of 15 microns.
Figures 23A, 23B:
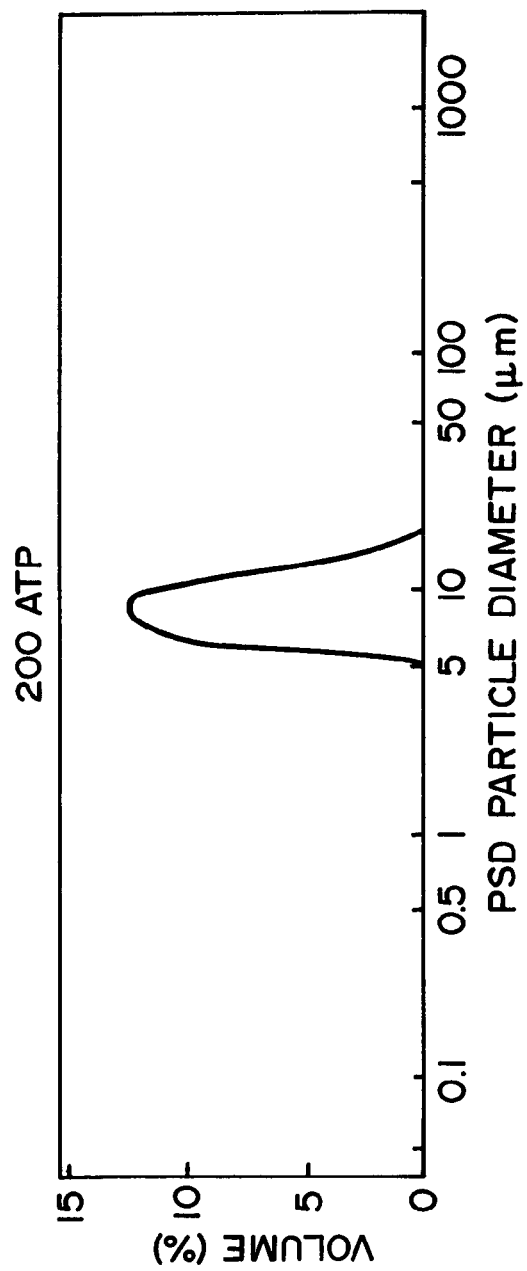
FIG. 23A is a particle size distribution curve of the product issuing from the air classifier stage of the method disclosed in FIG. 21 with the minimum grain size reduced to the targeted level of 5 microns.
FIG. 23B is a table of the particle size distribution curve set forth in FIG. 23A to define the product as produced by the second preferred method as described in FIG. 21.

In the representative test run, the parameters of the model 400 AFG jet mill 410 with a feed rate of about 240 lbs/hr are tabulated with the particle size distribution also listed in the table 410a of FIG. 22. This operation provided an intermediate nepheline syenite powder in line 412 having the particle size or distribution shown in the graph of FIG. 22A and the table of FIG. 22B. This intermediate material processed by the mill and internal classifier using parameters listed in the table 410a of FIG. 22 was directed into the air classifier, which classifier was set to parameters tabulated in the table of FIG. 23. Operating under these parameters, the 200 ATP air classifier 420 produced the powder recorded in the table 420a of FIG. 23 and having the particle size distribution shown in the curve or graph shown in FIG. 23A and in the table of FIG. 23B. This final product in the representative test run had a controlled maximum particle size D99 of 14.15 microns with 98.7% of the powder having a particle size less than 15 microns. The invention involves the control of the minimum particle size which is illustrated as being 5.78 microns for D4 and with about 0.5% of the particles having a particle size less than 5 microns. This representative test run produced the novel ultra-fine nepheline syenite powder with a controlled minimum particle size of about 5 microns and a controlled maximum particle size of about 15 microns and having the product specifications of FIG. 24. The same method has been used to produce other samples of the novel nepheline syenite powder as described and disclosed herein.

The representative test run set forth in the drawings of this application related to use of method P; however, research and development is being conducted on using serial air classifiers especially of the Alpine model 200 ATP. They have proven successful in controlling the minimum particle size of the ultra-fine nepheline syenite powder. Such control of the minimum particle size is unique in the nepheline syenite powder art. Irrespective of the novelty of the new powder, there is a substantial technological advance in the development and use of the method of FIGS. 13 and 21. The methods are inventions in themselves in that they have been combined and used for controlling the minimum particle size and additionally the maximum particle size of nepheline syenite powder in a manner not known in the nepheline syenite powder art.

Individual steps or operations in the several methods can be combined and modified to produce the novel ultra-fine nepheline syenite powder. These combinations are novel and inventive. It is not intended that the disclosed embodiments of the method or the specific samples of novel nepheline syenite powder are to be limited to the actual examples or samples; but, the invention as described includes such modifications and alternatives as would occur to a person upon reading and understanding this detailed description of the several inventions. Further, the invention involves coatings using the novel "ultra-fine" nepheline powders as defined in the claims.

Having thus described the invention, the following is claimed:

1. An ultra-fine nepheline syenite powder having a D 99 particle size in the range of 15-19 microns, a D 1 particle size in the range of 2-8 microns and a D 50 particle size in the range of 8-11 microns.

2. An ultra-fine nepheline syenite powder as defined in claim 1 where said powder has a narrow particle size distribution between the D 95 particle size and the D 5 particle size of a value less than 12 microns.

3. An ultra-fine nepheline syenite powder as defined in claim 2 wherein the D 99 particle size is targeted at about 15 microns and the D 5 particle size is targeted at about 5 microns.

* * * * *